United States Patent [19]

Kaufman

[11] Patent Number: 5,416,978
[45] Date of Patent: May 23, 1995

[54] MARKING DEVICE

[76] Inventor: Marc Kaufman, 311 Sunnyslope, Andover, Kans. 67002

[21] Appl. No.: 102,861

[22] Filed: Aug. 6, 1993

Related U.S. Application Data

[63] Continuation-in-part of Ser. No. 45,047, Apr. 8, 1993, abandoned.

[51] Int. Cl.$^6$ .......................... B25H 7/04; G01B 3/10
[52] U.S. Cl. ........................................ 33/770; 33/668; 33/39.1; 33/761
[58] Field of Search .............. 33/770, 668, 34, 35, 33/36, 37, 38, 39.1, 736, 737, 755, 759, 760, 761, 762, 763, 768, 769

[56] References Cited

U.S. PATENT DOCUMENTS

| | | | |
|---|---|---|---|
| 2,708,315 | 5/1955 | Goswick | 33/34 |
| 3,046,884 | 7/1962 | Pearson | 33/36 |
| 3,063,370 | 11/1962 | Eberhardt | 33/36 |
| 3,087,248 | 4/1963 | Martin | 33/34 |
| 3,436,954 | 4/1969 | Eppler | 33/736 |
| 3,885,314 | 5/1975 | Banas, Sr. | 33/668 |
| 4,233,749 | 11/1980 | Coulter et al. | 33/737 |
| 4,301,596 | 11/1981 | Sedlock | 33/755 |
| 4,372,049 | 2/1983 | Hogue | 33/36 |
| 4,439,927 | 4/1984 | Elliott | 33/668 |
| 4,551,847 | 11/1985 | Caldwell | 33/755 |
| 4,729,171 | 3/1988 | Samson | 33/668 |

Primary Examiner—Christopher W. Fulton
Attorney, Agent, or Firm—John Wade Carpenter

[57] ABSTRACT

A marking device having a housing with a tape opening and a marker opening. A coiled tape is disposed within the housing such that the coiled tape may be extended or retracted through the tape opening. At least one linkage engaging aperture is secured to the coiled tape. A marking member is movably disposed within the housing and is adaptable to extend and retract within the marker opening. A linkage assembly is movably disposed within the housing such that when the linkage engaging aperture engages the linkage assembly, the linkage assembly engages and moves the marking member through the marker opening.

37 Claims, 23 Drawing Sheets

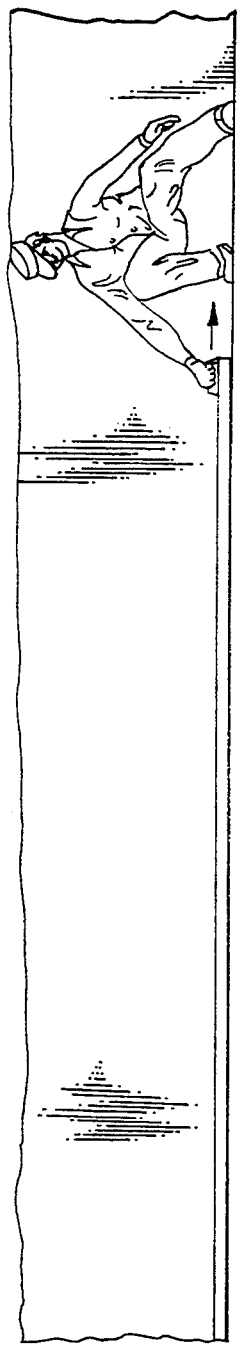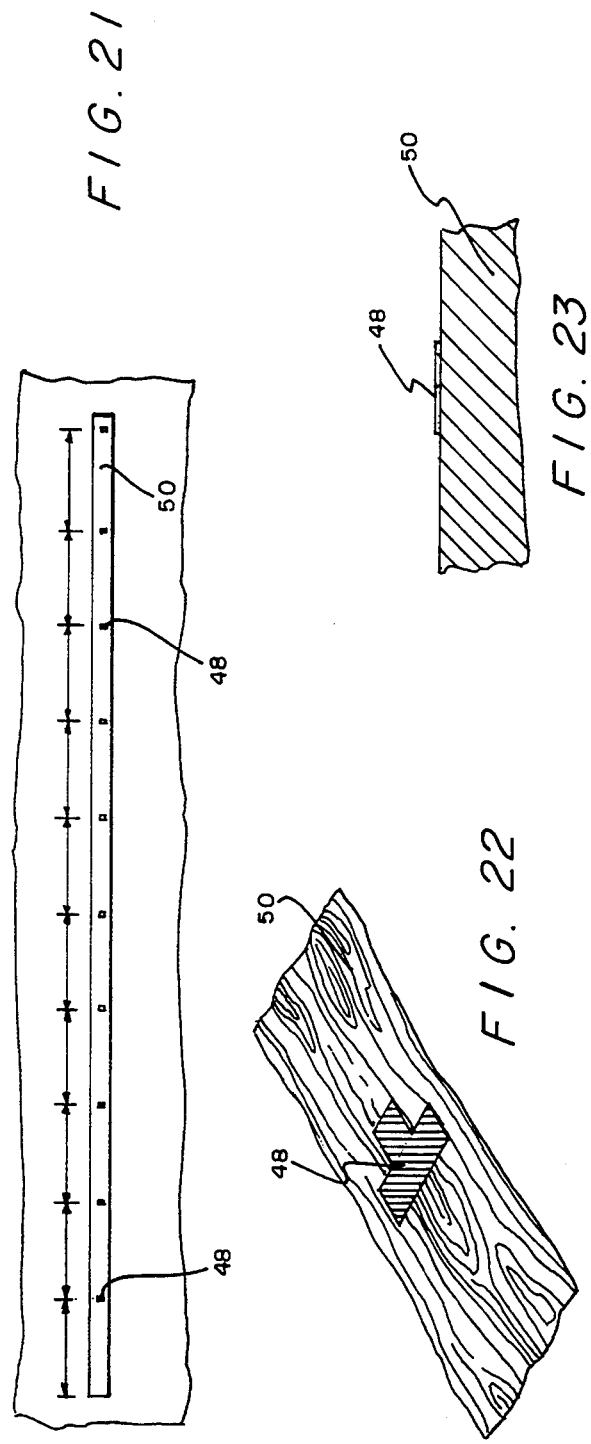

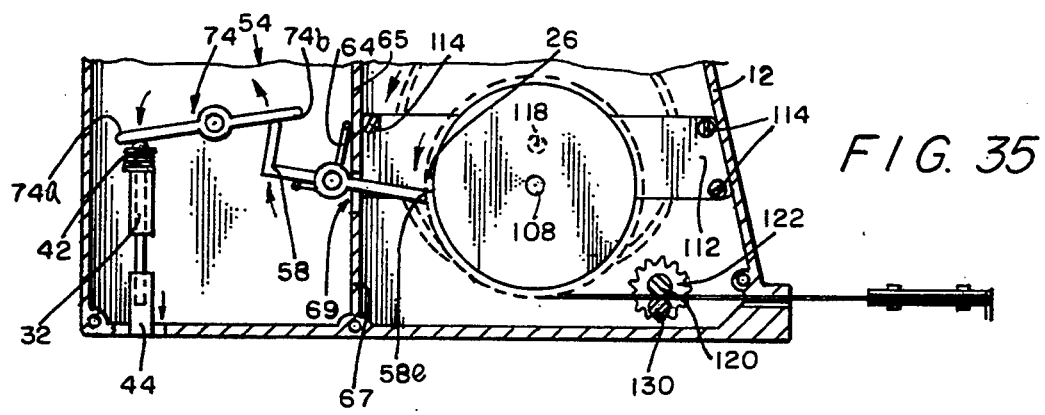
FIG. 35
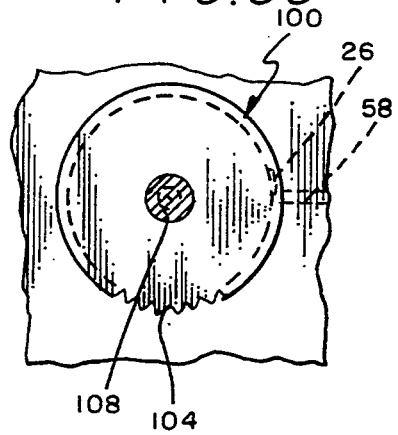
FIG. 36
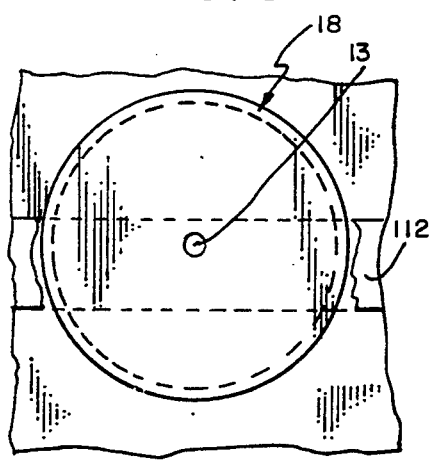
FIG. 37
FIG. 38
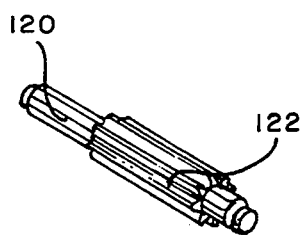
FIG. 39

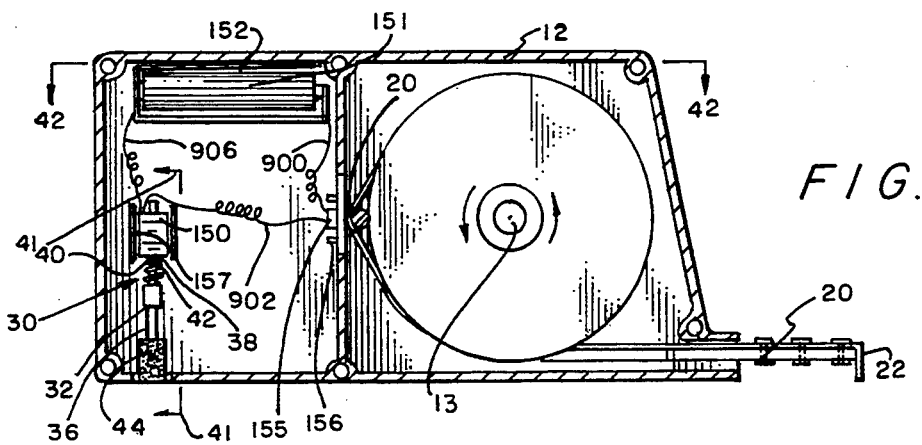
FIG. 40
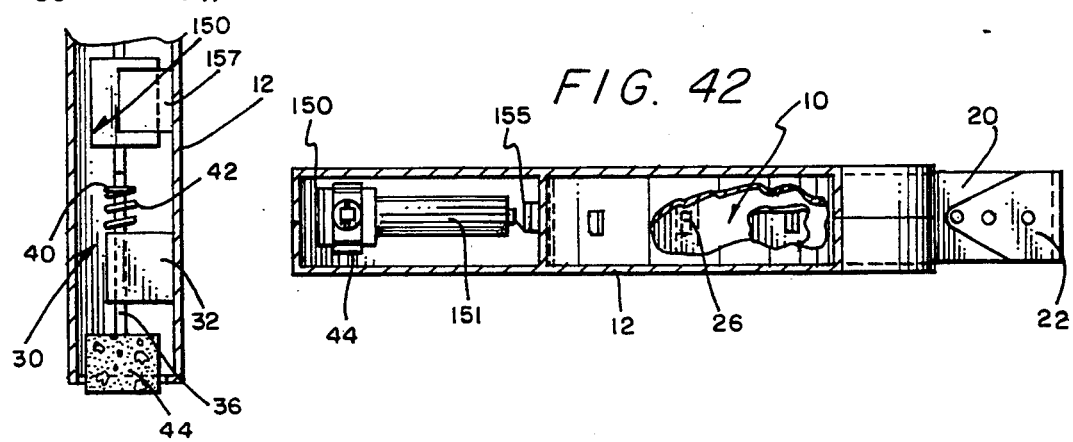
FIG. 42
FIG. 41
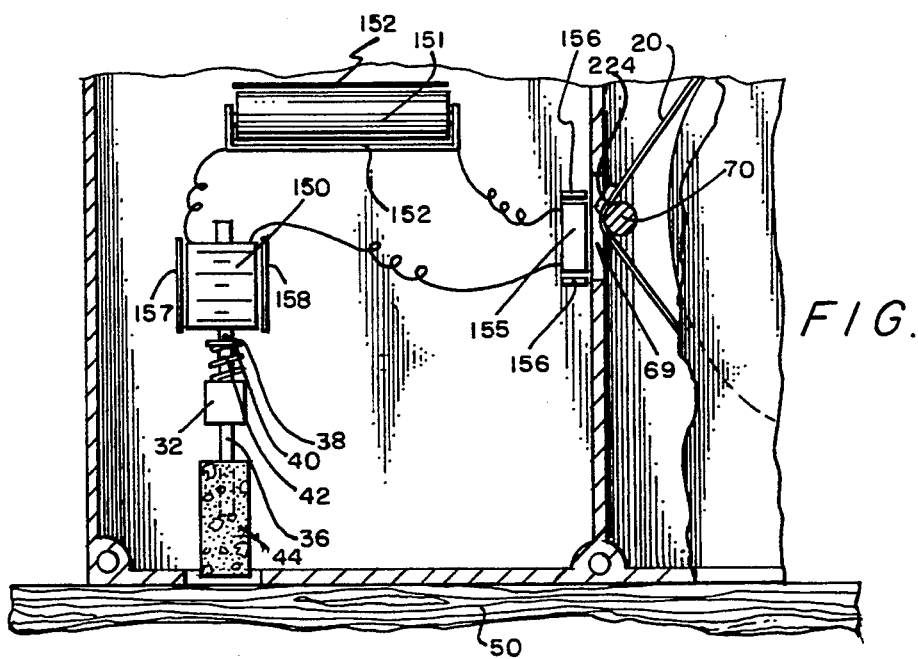
FIG. 44

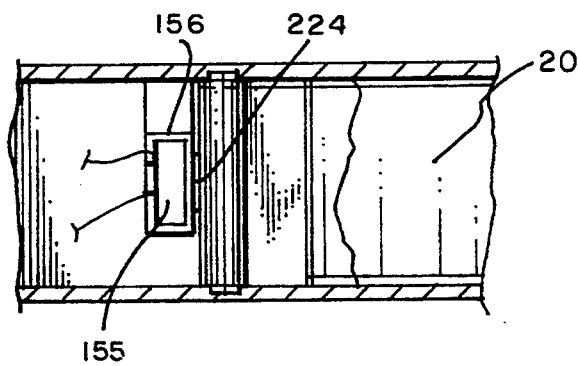
FIG. 46
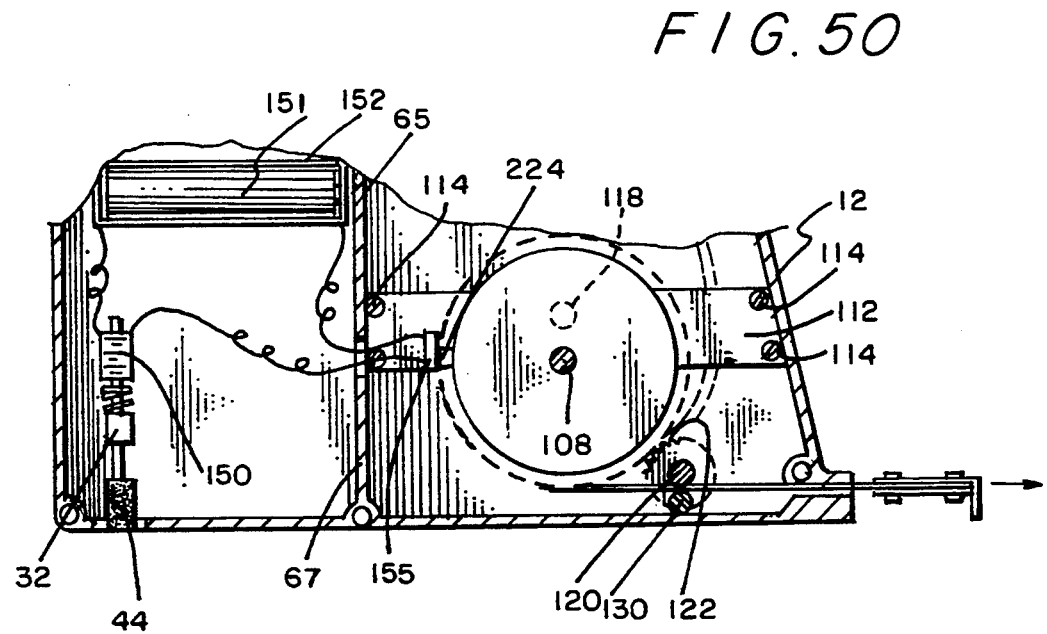
FIG. 50
FIG. 51
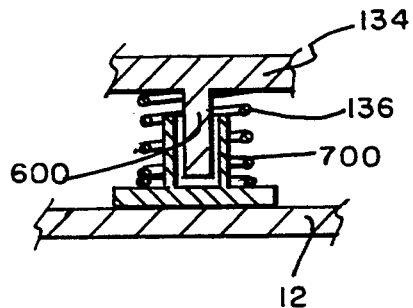

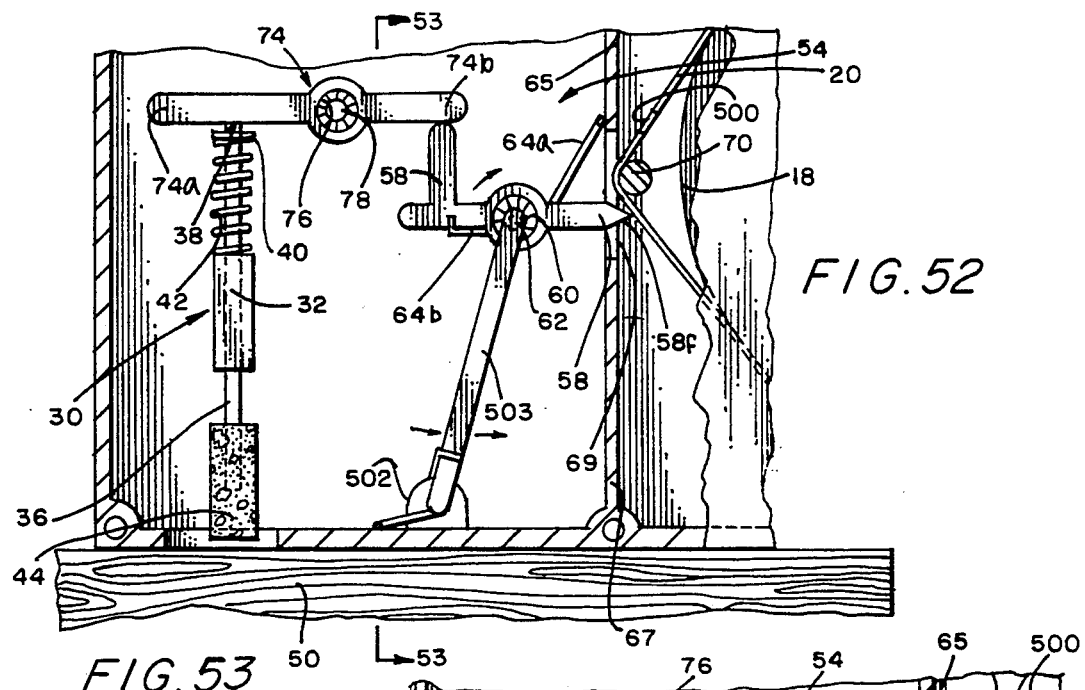
FIG. 52
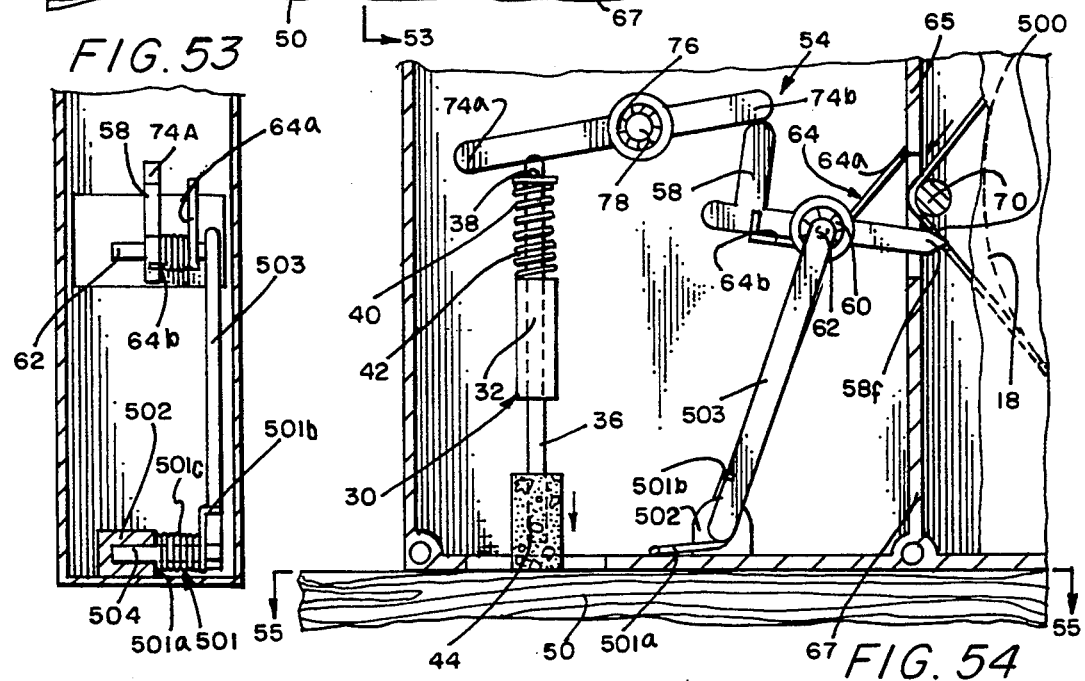
FIG. 53
FIG. 54
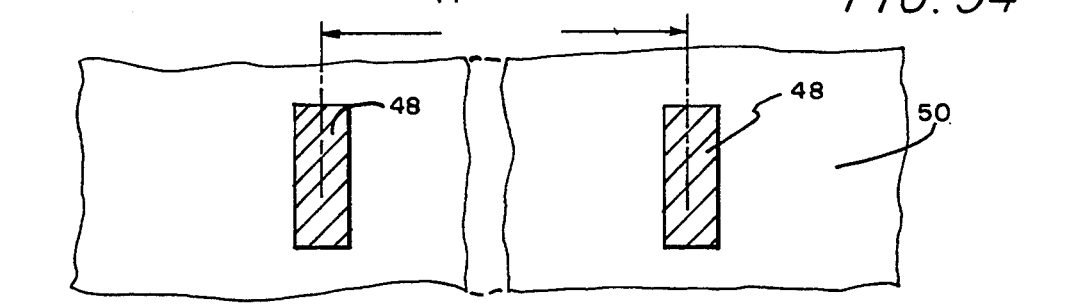
FIG. 55

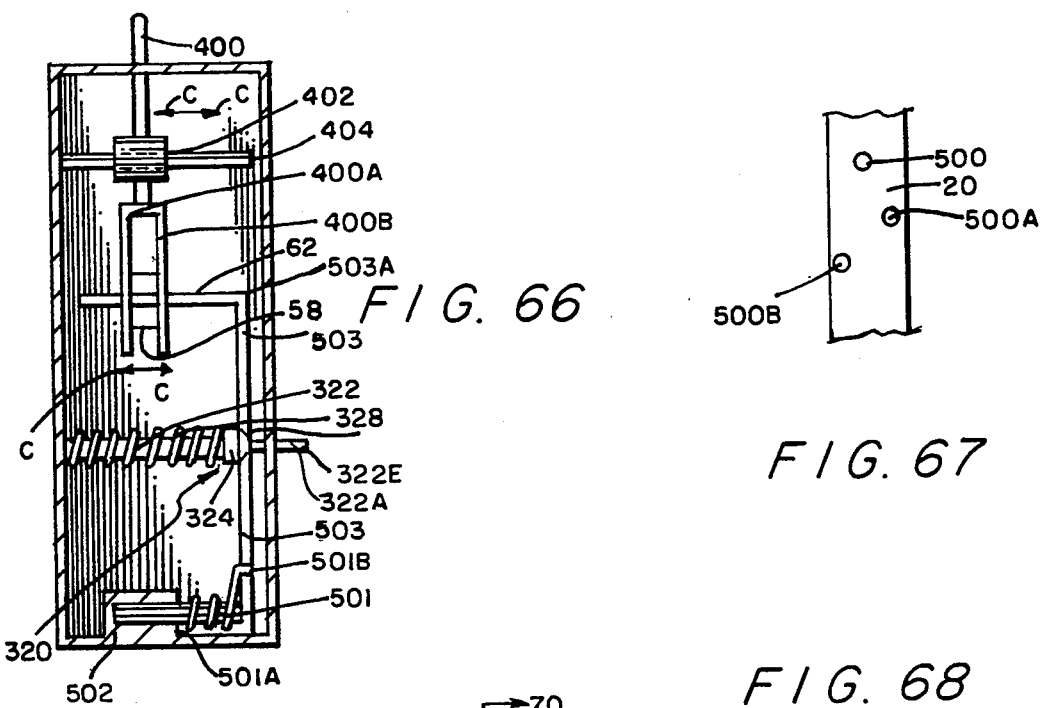
FIG. 66
FIG. 67
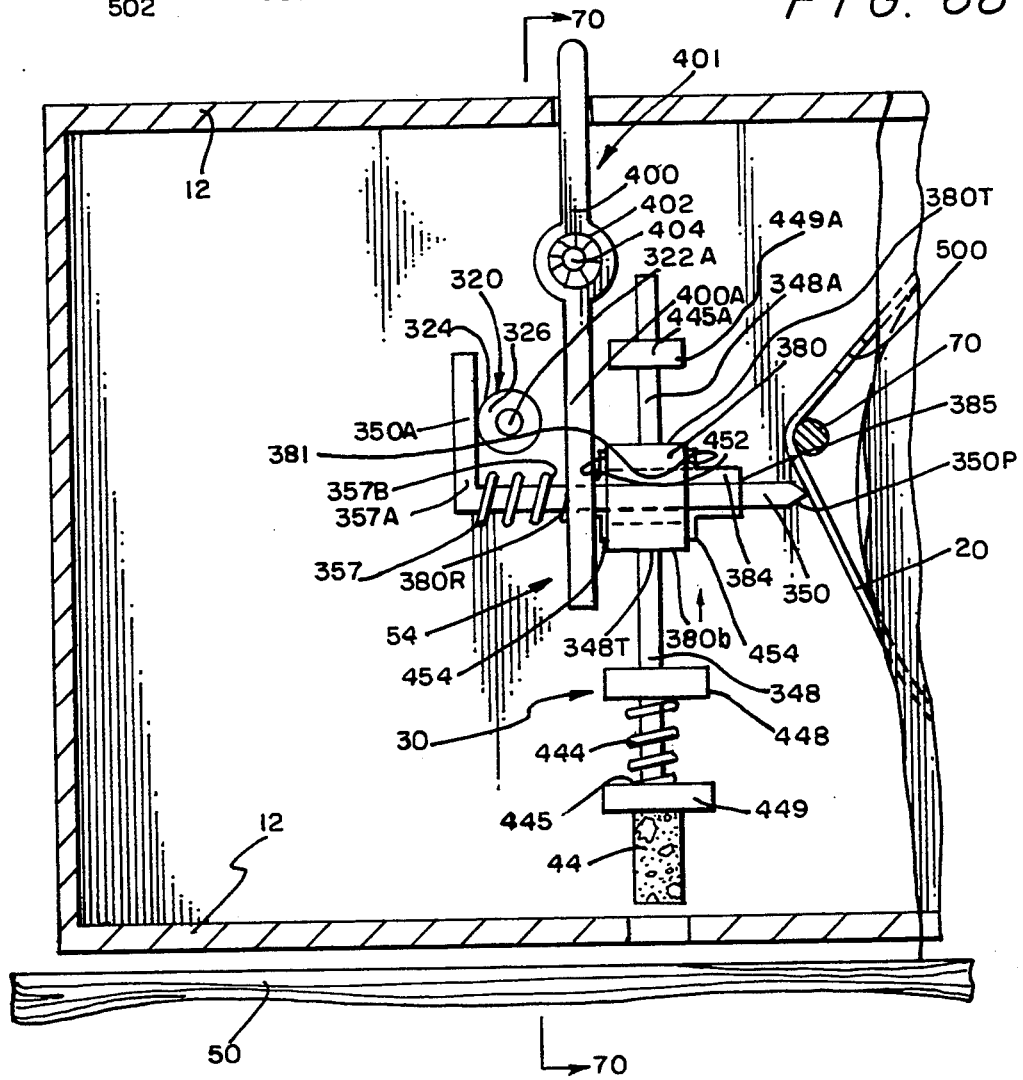
FIG. 68

MARKING DEVICE

This is a continuation-in-part application of application having Ser. No. 08/045,047, filed Apr. 8, 1993, now abandoned. Benefit of all earlier filing dates is hereby claimed.

FIELD OF THE INVENTION

The present invention provides for a marking device. More specifically, the present invention provides for a marking device that is capable of leaving a plurality of marks along the surface of an article.

DESCRIPTION OF THE PRIOR ART

A patentability investigation was conducted and the following U.S. Patents by Nos. was discovered:
U.S. Pat. No. 3,046,884—titled: MARKING DEVICE to Pearson
U.S. Pat. No. 4,439,927—titled: TAPE MEASURE to Elliott
U.S. Pat. No. 4,845,858—titled: STUD LOCATING TAPE to Thomas
U.S. Pat. No. 4,942,670—titled: ADHESIVE TEMPLATE TAPE to Brandt None of the foregoing prior art U.S. Patents teach or suggest the particular marking device of the present invention.

SUMMARY OF THE INVENTION

The present invention accomplishes its desired objects by broadly providing a marking device comprising a housing having a tape opening and a marker opening. A coiled tape is disposed within the housing such that the coiled tape may be extended or retracted through the tape opening. At least one linkage engaging member is secured to the coiled tape, and a marking member is movably disposed within the housing and adaptable to extend and retract through the marker opening. The marking device further comprises a linkage assembly movably disposed within the housing such that when the linkage engaging member engages the linkage assembly, the linkage assembly engages and moves the marking member through the marker opening.

The present invention further accomplishes its desired objects by further broadly providing a marking device comprising a housing having a tape opening and a marker opening. A coiled tape is disposed within the housing such that as tape is uncoiled from the coiled tape, the tape may be extended or retracted through the tape opening. A biased lower roller means is disposed in the housing for biasing the tape against an upper roller means as it is being uncoiled. Upper roller means is rotatably disposed in the housing for engaging the tape as it is being uncoiled, and a wheel member is rotatably disposed within the housing and rotatably engages the upper roller means. At least one linkage engaging member is secured to the wheel member; and a marking member movably is disposed within the housing and adaptable to extend and retract through the marker opening. The marking device further comprises a linkage assembly movably disposed within the housing such that when the linkage engaging member engages the linkage assembly, the linkage assembly engages and moves the marking member through the marker opening.

It is therefore an object of the present invention to provide a marking device.

These, together with the various ancillary objects and features which will become apparent to those skilled in the art as the following description proceeds, are attained by this novel marking device, a preferred embodiment as shown with reference to the accompanying drawings, by way of example only, wherein;

BRIEF DESCRIPTION

FIG. 1 is a perspective view of the marking device;
FIG. 2 is a top plan view of the marking device of FIG. 1;
FIG. 3 is a front elevational view of the marking device of FIG. 1;
FIG. 4 is a rear elevational view of the marking device of FIG. 1;
FIG. 5 is a bottom plan view of the marking device;
FIG. 6 is a perspective view of the marking device;
FIG. 7 is a vertical sectional view of the marking device disclosing the internals of the same;
FIG. 8 is a vertical sectional view taken in direction of the arrows and along the plane of line 8—8 in FIG. 7;
FIG. 9 is a horizontal sectional view taken in direction of the arrows and along the plane of line 9—9 in FIG. 8;
FIG. 10 is a horizontal sectional view taken in direction of the arrows and along the plane of line 10—10 in FIG. 7;
FIG. 11 is a side elevational view of one of the lever members;
FIG. 12 is a top plan view of the lever member in FIG. 11;
FIG. 13 is a vertical sectional view taken in direction of the arrows and along the plane of line 13—13 in FIG. 7;
FIG. 14 is a side elevational view of another lever member;
FIG. 15 is a vertical sectional view taken in direction of the arrows and along the plane of line 15—15 in FIG. 7;
FIG. 16 is a top plan view of the lever of FIG. 14;
FIG. 17 is a segmented enlarged disassembled view of the marking device, disclosing the internals in a perspective view;
FIG. 18 is a horizontal sectional view taken in direction of the arrows and along the plane of line 18—18 in FIG. 7;
FIG. 19 is a perspective view of one of the bearing members for one of the levers;
FIG. 20 is a front elevational view of a user grasping the marking device and pulling the same across a surface which is to be marked;
FIG. 21 is a top plan view of the surface which was marked by the user of FIG. 20;
FIG. 22 is a partial enlarged perspective view of the surface having a mark deposited thereon;
FIG. 23 is a vertical sectional view of the surface disclosing the mark deposited thereon;
FIG. 24 is a partial vertical sectional view disclosing operation of the internals of the marking device, immediately before a linkage engaging member is to engage a beveled end of a lever;
FIG. 25 is a partial side elevational view of the internals of the marking device after the linkage engaging member has engaged the beveled end of the lever to cause same to rotate and activate the marker assembly;
FIG. 26 is a horizontal sectional view taken in direction of the arrows and along the plane of line 26—26 in FIG. 25;

FIG. 35 is a partial vertical sectional view of the embodiment of the marking device of FIG. 32 after the linkage engaging member on the wheel has engaged the beveled end of a lever;

FIG. 36 is a vertical sectional view taken in direction of the arrows and along the plane of line 36—36 in FIG. 33;

FIG. 37 is a vertical sectional view taken in direction of the arrows and along the plane of line 37—37 in FIG. 33;

FIG. 38 is a perspective view of the bearing plate for holding the free end of the shaft that supports the uncoiled tape and the shaft for supporting the wheel which has the linkage engaging member;

FIG. 39 is a perspective view of the shaft having the bearing surface keyed to or formed therein;

FIG. 40 is a vertical sectional view of another embodiment of the marking device disclosing the internals of the same;

FIG. 41 is a vertical elevational view taken in direction of the arrows and along the plane of line 41—41 in FIG. 40;

FIG. 42 is a horizontal sectional view taken in direction of the arrows and along the plane of line 42—42 in FIG. 40;

FIG. 44 is a partial vertical sectional view disclosing operation of the internals of the marking device disclosed in FIG. 40, immediately before a magnetic strip on the tape is to activate the magnetic sensor that will cause the electronic solenoid to drive and activate the marker assembly;

FIG. 46 is a horizontal sectional view taken in direction of the arrows and along the plane of line 46—46 in FIG. 45;

FIG. 50 is a partial vertical sectional view of the embodiment of the marking device of FIG. 47 after the magnetic strip of the wheel has activated the magnetic sensor that has caused the electronic solenoid to drive and activate the marker assembly;

FIG. 51 is a partial vertical sectional view of a tongue on the bottom of a frame being vertically slidably supported within a sleeve which is connected to the bottom of the housing;

FIG. 52 is a partial vertical sectional view disclosing operation of the internals of the marking device, immediately before a linkage engaging aperture is to engage a pointed end of a lever;

FIG. 53 is a partial vertical elevational view taken in direction of the arrows and along the plane of line 53—53 in FIG. 52;

FIG. 54 is a partial vertical sectional view disclosing operation of the internals of the marking device after the linkage engaging aperture has engaged the pointed end of the lever to cause same to rotate and activate the marker assembly;

FIG. 55 is a horizontal sectional view taken in direction of the arrows and along the plane of line 55 in FIG. 54;

FIG. 66 is a partial vertical elevational view taken in direction of the arrows and along the plane of line 66—66 in FIG. 63;

FIG. 67 is a partial top plan view of the tape of the invention having another set of linkage engaging apertures disposed therein;

FIG. 68 is a partial vertical sectional view disclosing operation of internals of the marking, device, before a linkage engaging aperture is to engage a pointed end of a lever;

DETAILED DESCRIPTION OF THE INVENTION

Figure 1:
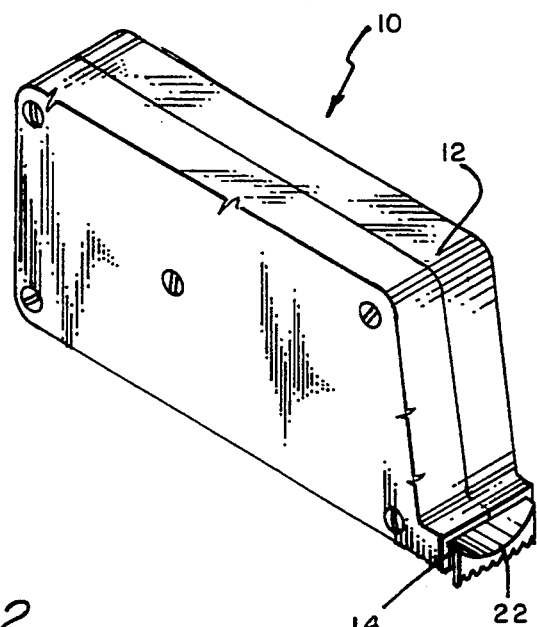
Figure 2:
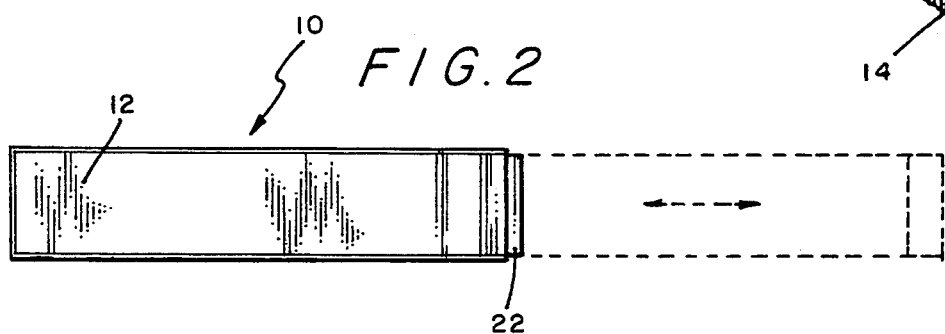
Figure 3:
Figure 4:
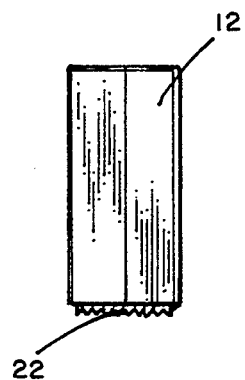
Figure 5:
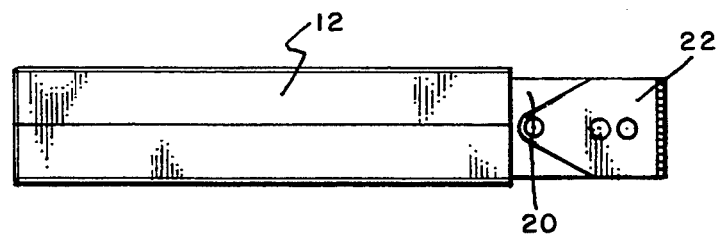
Figure 6:
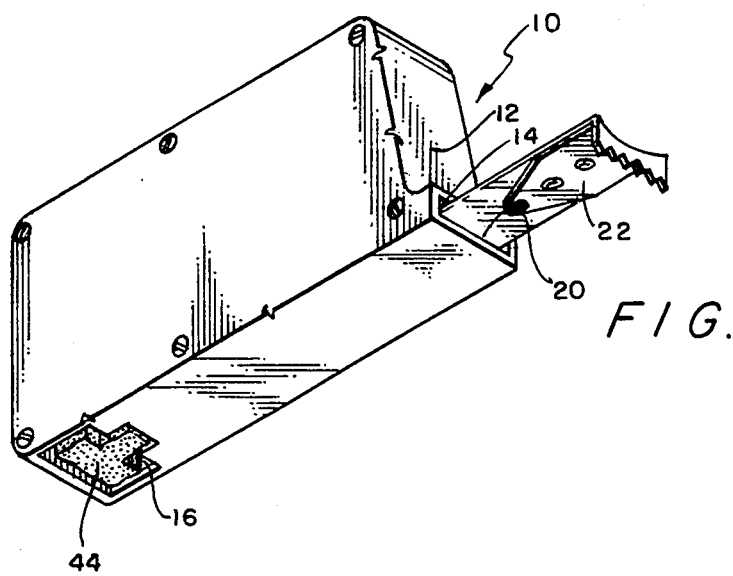

Referring in detail now to the drawings wherein similar parts of the invention are identified by like reference numerals, there is seen the marking device of the present invention, generally illustrated as 10. FIGS. 1-31 is one embodiment of the present invention, and FIGS. 32-39 is another embodiment of the present invention. Initially addressing the embodiment depicted in FIGS. 1-31, the marking device 10 comprises a casing or housing 12 having a slotted opening 14 and an opening 16. A coiled tape, generally illustrated as 18, is rotatably disposed within or to the inside of the housing 12 such that as tape 20 is uncoiled from the coiled tape 18, the tape 20 may be extended or retracted through the slotted opening 14 in the housing 12. The coiled tape 18 is rotatably mounted on shaft 13. The tape 20 has a tab end 22 secured to an end thereof. At least one linkage engaging member, generally illustrated as 24, is engaged to and on the tape 20. Preferably a plurality of linkage engaging members 24 is secured to the tape 20.

Figure 31:
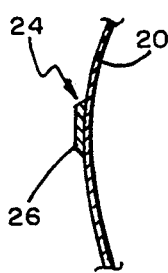
FIG. 31 is a vertical sectional view disclosing the lug member secured to the tape.

The engaging member 24 may be any suitable member, but is preferably a protruding lug 26 secured thereto as best shown in FIG. 31. Alternatively, the lug 26 is formed in the tape 20 during manufacturing, such as by indentation of the tape 20 (see FIG. 30). It is to be understood that for purposes of the present invention as described in the specification and as claimed in the claims, a lug 26 secured to the tape 20 (such as by solder weld, epoxy, etc.) is equivalent to the tape 20 having the lug 26 inherently formed therein through indentation or the like.

Figure 32:
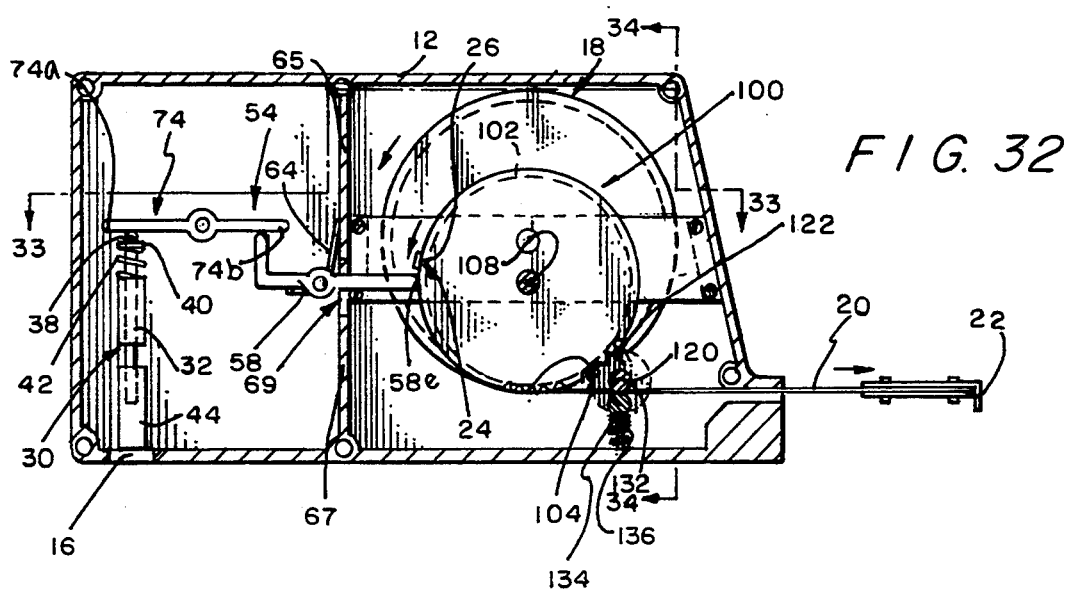
FIG. 32 is a vertical sectional view disclosing the internals of another embodiment of the marking device.
Figure 33:
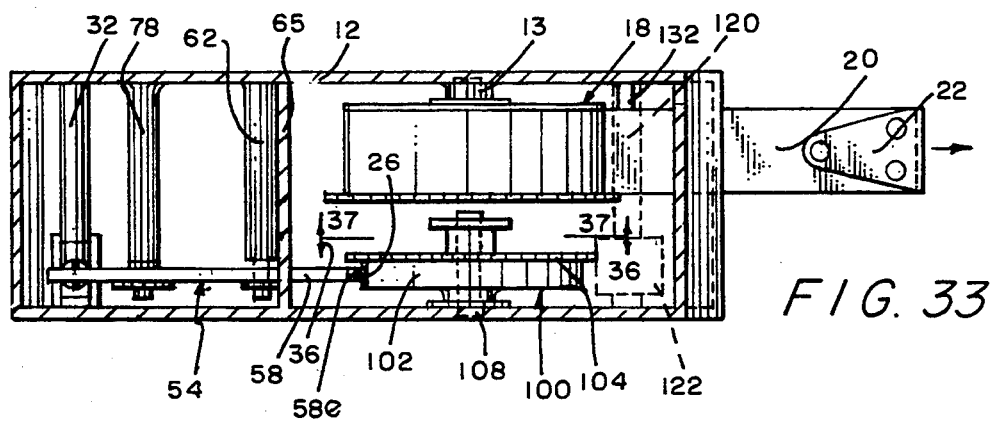
FIG. 33 is a horizontal sectional view taken in direction of the arrows and along the plane of line 33—33 in FIG. 32.

A marker assembly, generally illustrated as 30, is disposed in the housing 12. The marker assembly 30 comprises a bracket 32 secured to an inside wall of the housing 12. The bracket 32 has an opening 34 (preferably square or rectangular in geometry) wherethrough a shaft 36 (preferably also square or rectangular in geometry) slidably passes such as to be capable of sliding up and down. A pin 38 passes through the head of the shaft 36, and a flanged washer member 40 is slidably disposed on the shaft 36 underneath the pin 38. A spring member 42 helically surrounds the shaft 36 between the bracket 32 and the washer member 40. The spring member 42 is supported by the bracket 32 and biasingly engages the washer member 40 to bias upwardly the shaft 36 such that when the top of the shaft 36 is depressed, the shaft 36 is returned to its original posture when the depression is released. A marker 44 is secured to the end of the shaft 36. The marker 44 is preferably a consumable marker that may be formed from a variety of materials such as crayon, ink pad, chalk, lead, soap stone or tailor's crayons. Material of this type provide a highly visible mark which may be readily removed from most items. When the shaft 36 is driven downwardly the marker 44 passes through the opening 16 and deposits a mark 48 on an article or a substrate 50, such as a piece of wood (see FIG. 21). The marker 44 may be of any suitable shape, such as T-shaped as depicted in FIGS. 6, 7, 8 and 17, or square-shaped as depicted in FIGS. 32 and 35.

Figure 7:
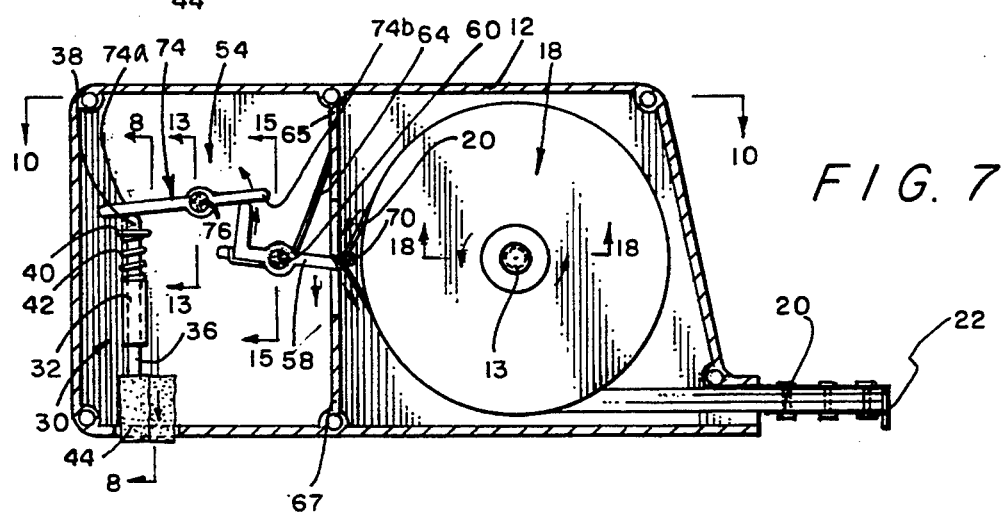
Figure 8:
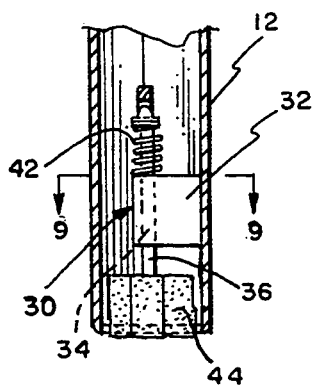
Figure 9:
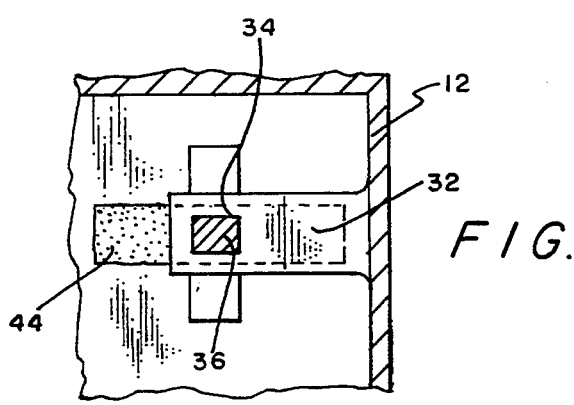
Figure 10:
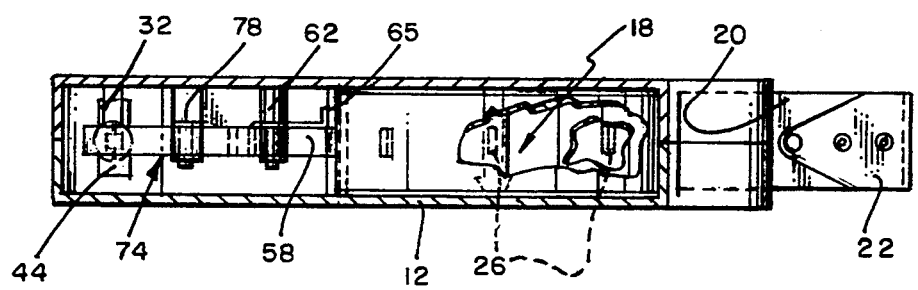
Figure 11:
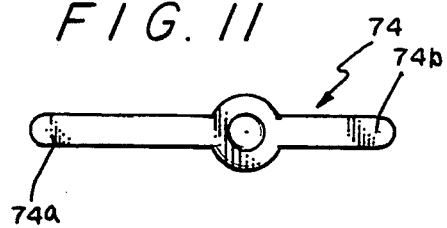
Figure 13:
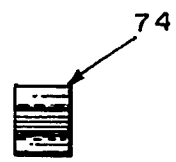
Figure 12:
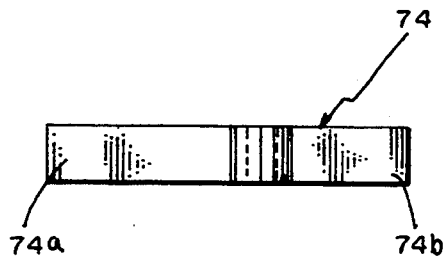
Figure 14:
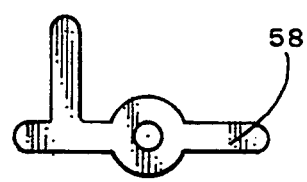
Figure 15:
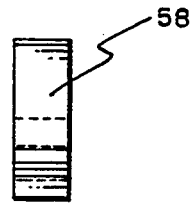
Figure 16:
Figures 17, 18, 19:
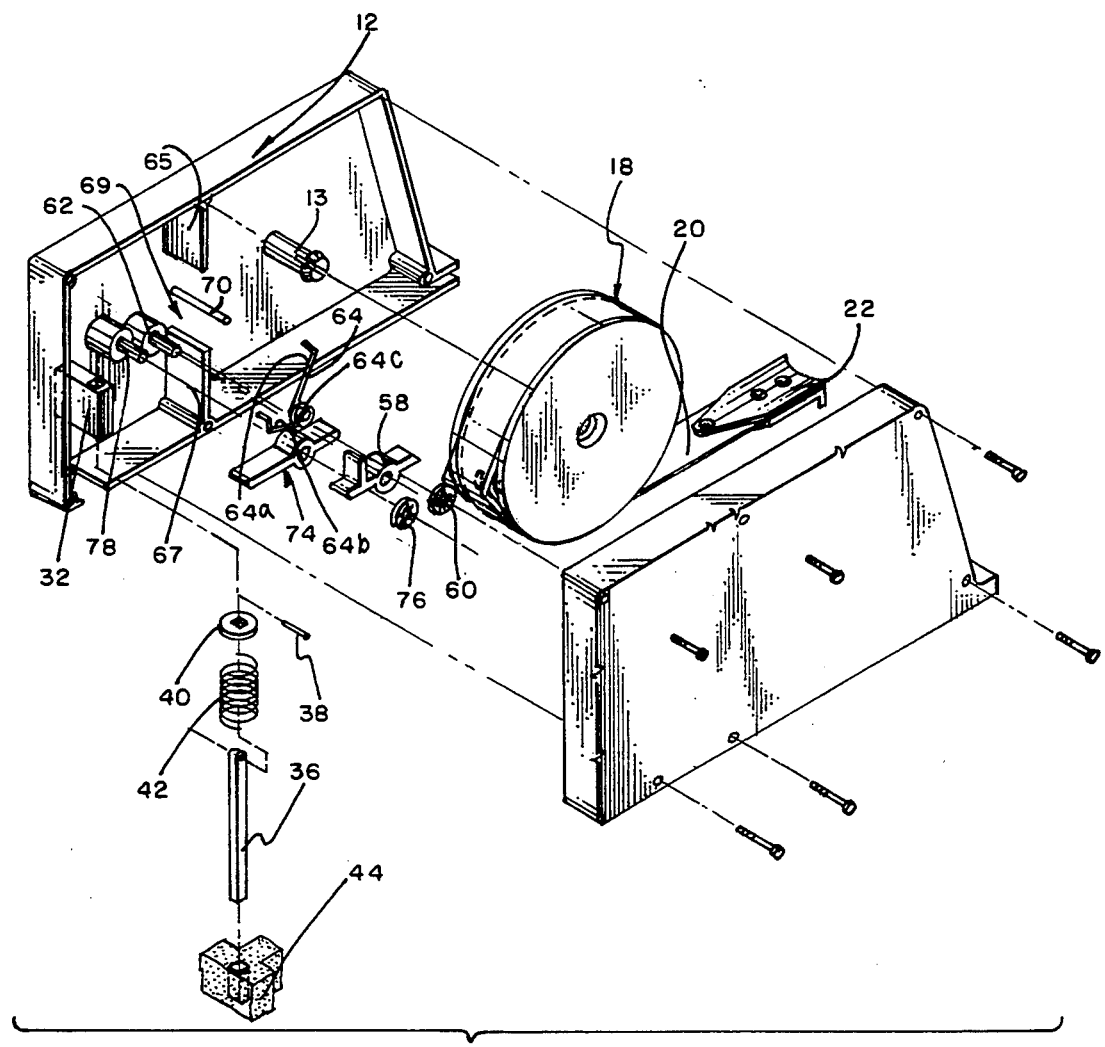
Figure 24:
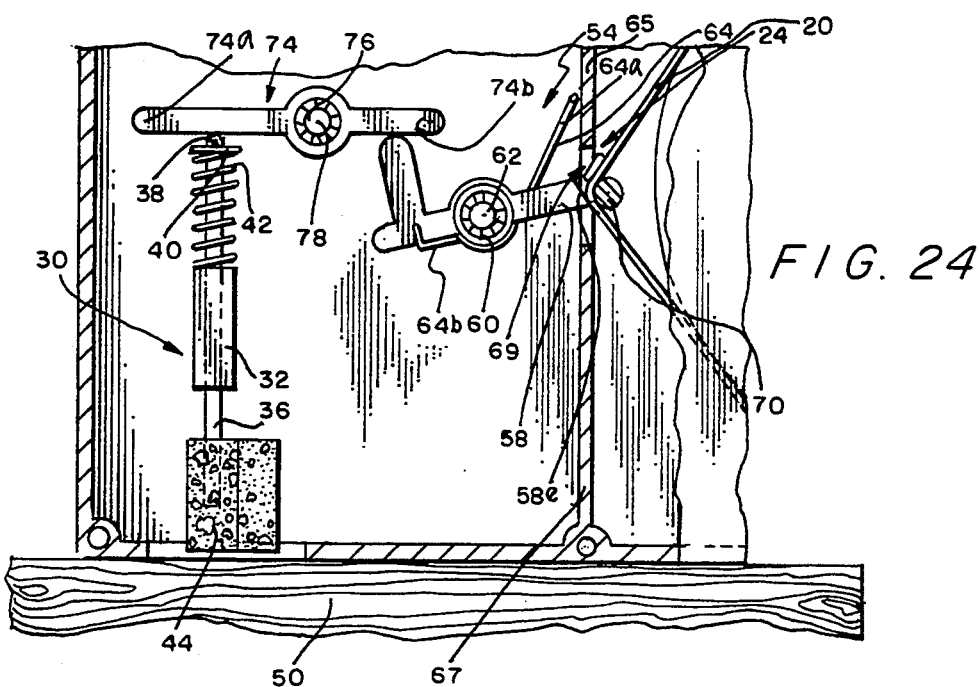
Figure 25:
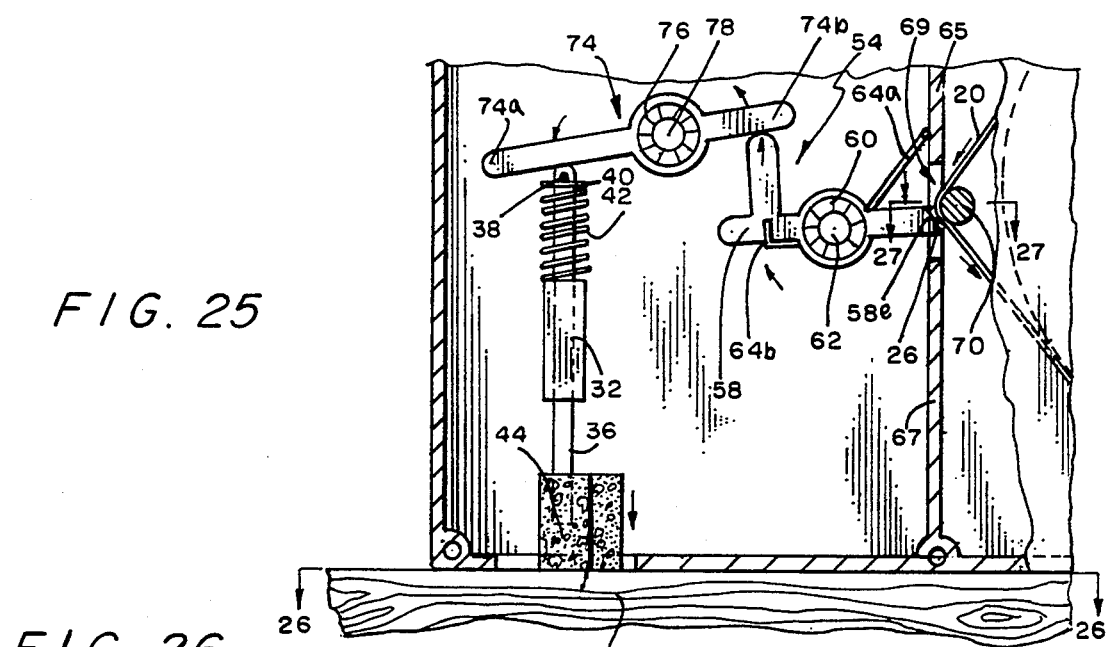
Figure 26:
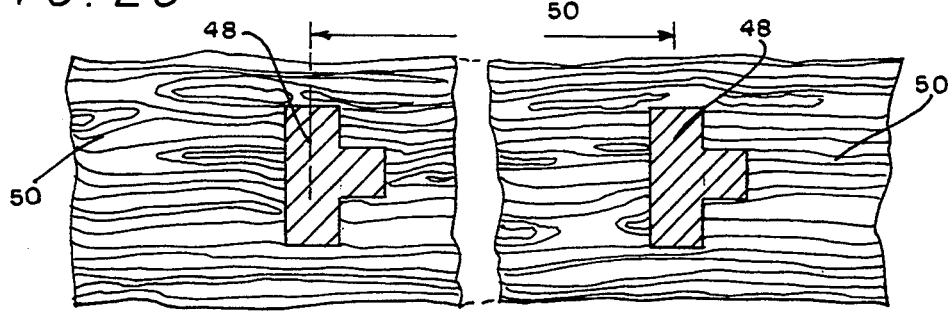
Figure 27:
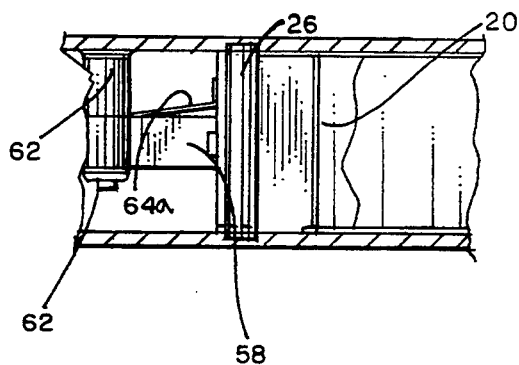
FIG. 27 is a horizontal sectional view taken in direction of the arrows and along the plane of line 27—27 in FIG. 25.
Figure 28:
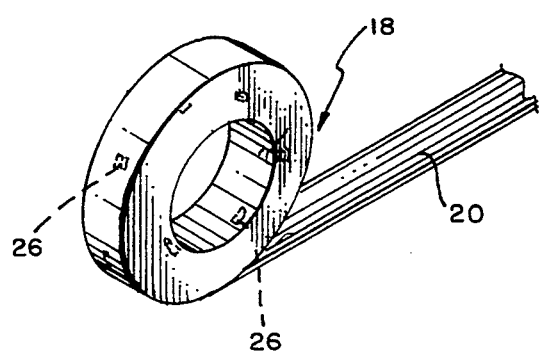
FIG. 28 is a perspective view of the coiled tape.
Figure 29:
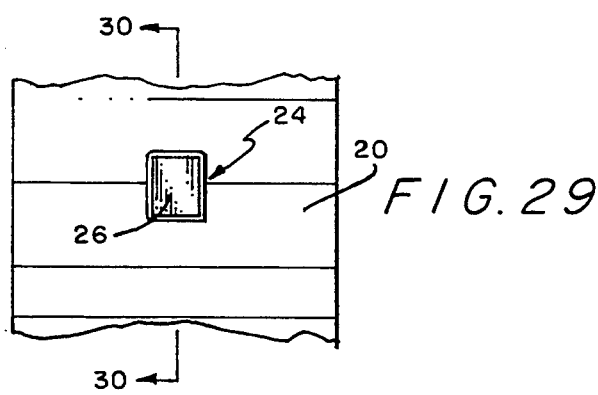
FIG. 29 is a partial view of the tape having secured thereto or formed therein a lug.
Figure 30:
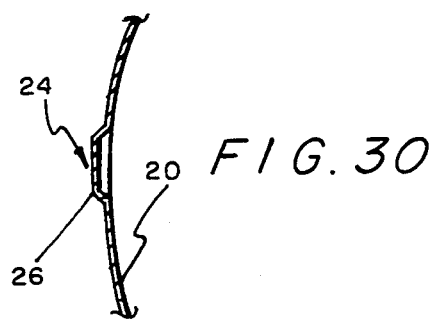
FIG. 30 is a vertical sectional view taken in direction of the arrows and along the plane of line 30—30 in FIG. 29.

A linkage assembly, generally illustrated as 54, is pivotably disposed within the housing 12 such that when the engaging member 24 (i.e. lug 26) engages the linkage assembly 54, the linkage assembly 54 engages and moves the marker assembly 30 to drive the marker 44 through the opening 16 to deposit a mark 48. The linkage assembly 54 comprises a spring biased generally L-shaped lever 58 mounted on a bearing 60 which is rotatably secured to a shaft 62. Lever 58 is normally biased upwardly or clockwise (with respect to the view in FIG. 7) by a spring 64 which is also engaged to the shaft 62. The spring 64 includes a pair of arms 64a and 64b extending outwardly from a helical center 64c that circumscribes the shaft 62. Arm 64b engages and contacts the lever 58 as depicted in FIG. 7 and 17. Arm 64a engages an upper partition 65 which is secured to an inside wall of the housing 12. A lower partition member 67 is also secured to an inside wall of the housing 12, and is spaced from the upper partition 65 to provide an opening 69 therebetween. Lever 58 is pivotably disposed on the shaft 62 such that as the linkage engaging member 24 (i.e. lug 26) on the tape 20 contacts a beveled end 58e of the lever 58 (see FIGS. 24, 25 and 27) the lever 58 pivots about shaft in a clockwise direction as depicted in FIGS. 7 and 25. A shaft 70 is conveniently secured to an inside wall of the housing 12 generally in the opening 69 and/or between the partition 65 and 69, and is spaced from coiled tape 18 such that as the tape 20 is uncoiled from or off of coiled tape 18, the tape 20 loops over and passes around the shaft 70 in order that each member 24 (lug 26) is capable of contacting the beveled end 58e of the lever 58 to pivot the same clockwise with respect to the view in FIG. 7. The linkage assembly 54 also includes a generally straight lever, generally illustrated as 74, mounted on a bearing 76 which is rotatably secured to a shaft 78. The lever 74 is normally biased clockwise by the upwardly biased shaft 36. More specifically, lever 74 has opposed ends 74a and 74b. End 74a is generally biased upwardly by the upwardly biased shaft 36. By end 74a being biased upwardly, a clockwise rotational motion with respect to the views in FIG. 7, 24 and 25 is placed on the lever 74, causing end 74b to be biased downwardly and tending to rotate clockwise. End 74b tends to bias lever 58 counterclockwise, opposite to the direction that spring 64 biases lever 58. As best shown in FIG. 24, before engaging member 24 (lug 26) engages the beveled end 58e of the lever 58, there is a steady state condition and "happy balance" among the marker assembly 30, the lever 74, and the lever 58—spring 64 combination. As tape 20 is being uncoiled and pulled over shaft 70, eventually an engaging member 24 (lug 26) comes into contact with an end (more specifically the beveled end 58e) of the lever 58. Such slidable contact and continual uncoiling of the tape 20 from the coiled tape 18 causes the engaging member 24 (lug 26) to slidably contact the end 58e and pivotably rotate clockwise the lever 58, driving end 74b upwardly (with the assistance of spring 64) and causing lever 74 to pivot counterclockwise and drive spring biased shaft 36 downwardly, resulting in the marker 44 depositing the mark 48 on a substrate 50 (all with respect to and as best shown in FIG. 25). After the mark 48 has been deposited, the engaging member 24 (lug 26) slips off of beveled end 58e and the inter-engaged cooperating combination of the marker assembly 30/lever 74/lever 58- spring 64 returns to the steady-state, "happy balance" of FIG. 24 until a subsequent or following engaging member 54 (lug 26) encounters the beveled-end 58e to start the marking process again.

In operation of the marking device 10 depicted in FIGS. 1–31, the tab end 22 of the tape 20 would be fixed on one edge of the article or substrate 50 to be measured and serially marked (see FIG. 20) and the lower part of the marking device 10 (i.e. more specifically the housing 12) would be positioned flushed against the article such that the surface of the article to be marked supports the marking device 10 and communicates with the opening 16. After the marking device 10 is affixed and postured as such, the marking device 10 is manually pulled slidably across the surface to be marked, causing the tape 20 to start uncoiling from the coiled tape 18. When the first engaging member 24 (i.e. lug 26) passes over shaft 70 and slidably engages the beveled end 58e of the lever 58, lever 58 (with the assistance of spring 64) rotates clockwise which simultaneously causes the lever 74 to pivot counterclockwise, all rotational directions with respect to the view in FIGS. 24 and 25. As lever 74 rotates counterclockwise, end 74a of lever 74 commences to drive spring biased shaft 36 downwardly until marker 44 contacts the article or substrate 50, causing the deposition of the mark 48. After the mark 48 has been placed on the article or substrate 50, the first engaging member 24 (i.e. lug 26) slidably passes off of beveled end 58e and the combination of the marker assembly 30/lever 74/lever 58-spring 64 immediately returns to the steady-state posture depicted in FIG. 24. The marking device 10 is continually pulled slidably across the surface to be marked (i.e. from left to right in FIG. 20) and the tape 20 continues to be uncoiled from coiled tape 18. When the second engaging member 24 (i.e. lug 26) passes over shaft 70 and slidably engages the beveled end 58e of the lever 58, lever 58 (with the assistance of spring 64) again rotates clockwise and the marking process (through actuation of the inter-engaging cooperating lever 75—marker assembly 30) is again repeated, causing the deposition of a second mark 48. After the second engaging member 24 (i.e. lug 26) slips off or from beveled end 58e, the cooperating combination of the marker assembly 30/lever 74/lever 58—spring 64 again returns to the steady-state posture depicted in FIG. 24. The marking process can be repeated to deposit a third mark 48, a fourth mark 48, and so on, until the marking device 10 reaches the end of the article or substrate 50 as best shown in FIG. 20. As best shown in FIG. 21, the resulting article or substrate 50 has a surface bearing a plurality of marks 48 which are spaced apart by a distance generally equal to the distance that the engaging members 24 are spaced on the tape 20. Thus, if the engaging member 24 are spaced apart by one (1) foot on the tape 20, then the marks 48 are spaced one (1) foot apart. It is obvious that the distance between engaging members 24 on the tape 20 may vary and not be the same, depending on desired results by the user of the marking device 10. Typically, the deposed marks 48 on the surface of the article or substrate are approximately the same distance.

Figure 34:
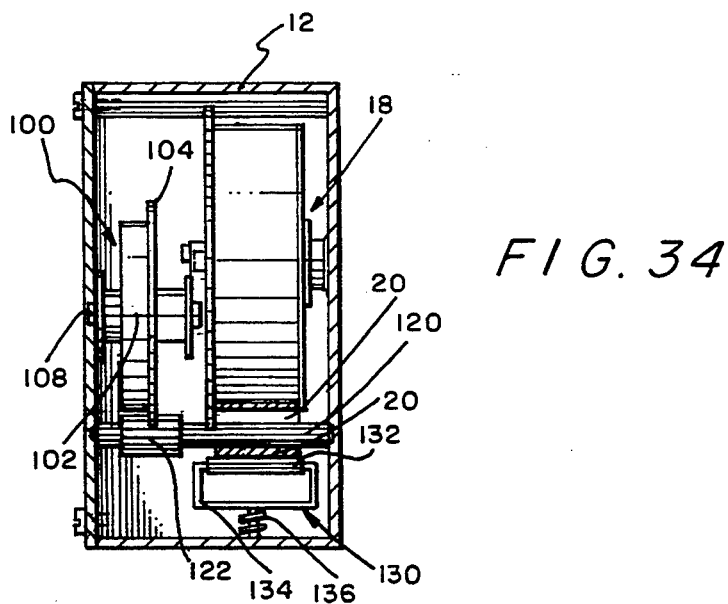
FIG. 34 is a vertical sectional view taken in direction of the arrows and along the plane of line 34—34 in FIG. 32.
Figure 43:
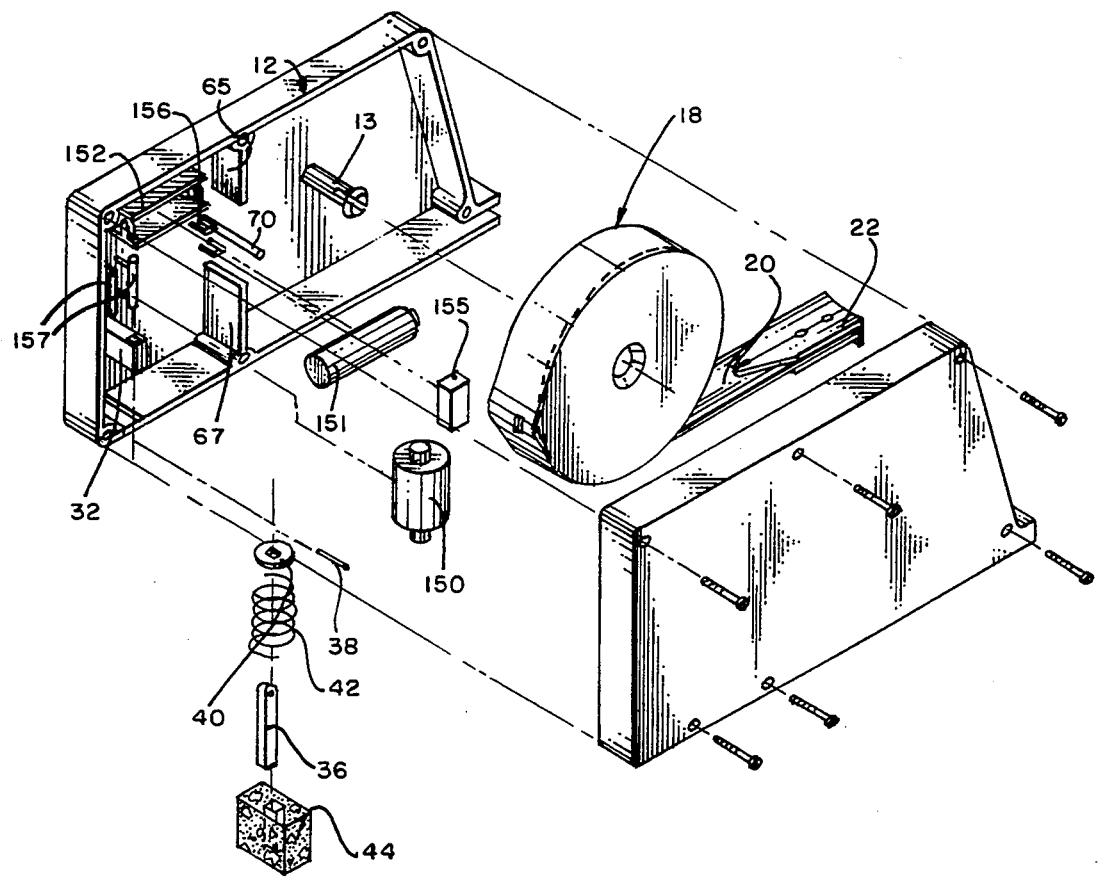
FIG. 43 is a segmental enlarged disassembled view of the embodiment of the marking device disclosed in FIG. 40, disclosing the internals of this embodiment in a perspective view.
Figure 45:
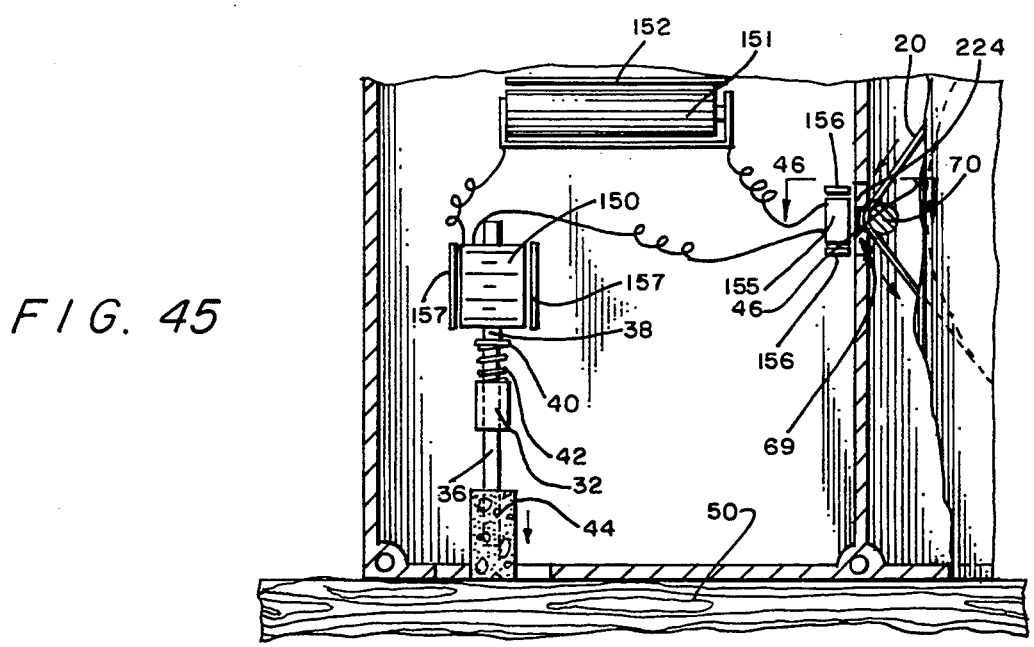
FIG. 45 is a partial side elevational view of the internals of the marking device of FIG. 44 after the magnetic strip on the tape has activated the magnetic sensor that has caused the electronic solenoid to drive and activate the marker assembly.
Figure 47:
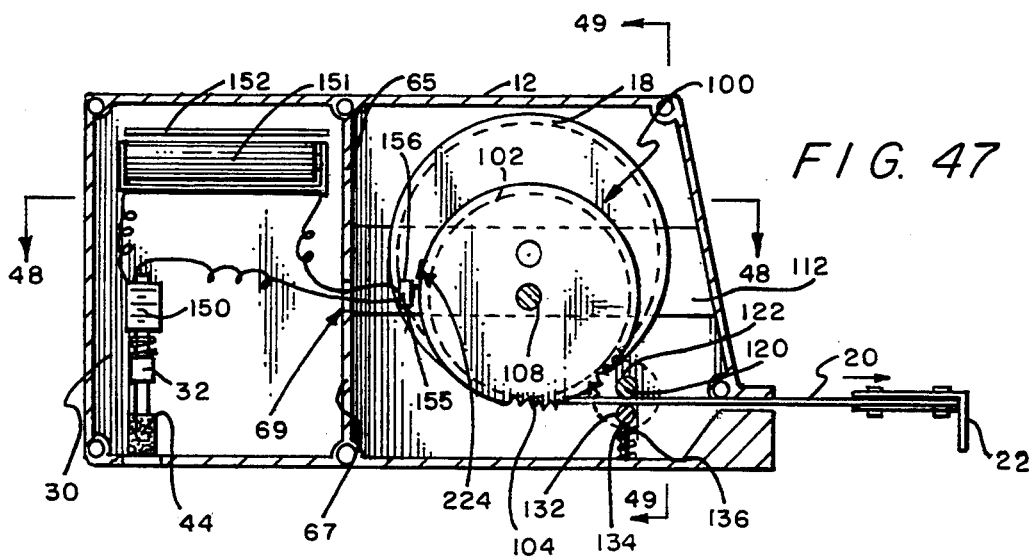
FIG. 47 is a vertical sectional view disclosing the internals of still yet another embodiment of the marking device.
Figure 48:
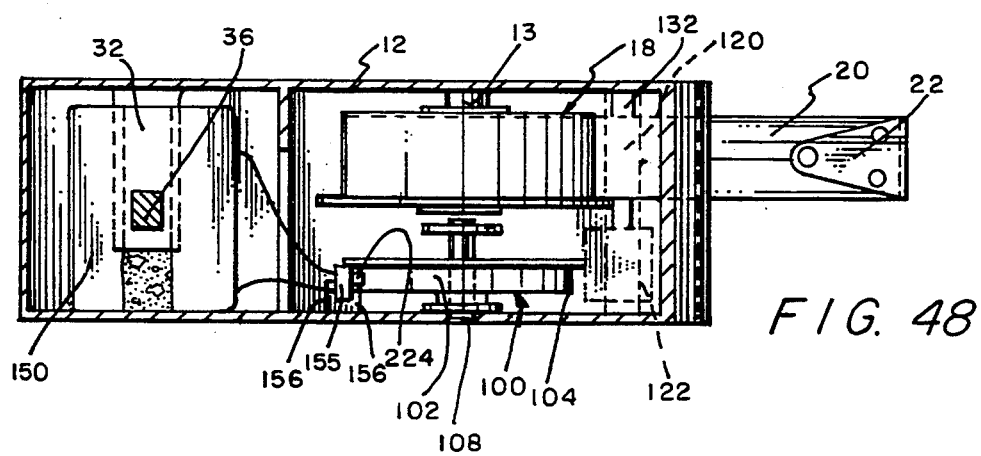
FIG. 48 is a horizontal sectional view taken in directions of the arrows and along the plane of line 48—48 in FIG. 47.
Figure 49:
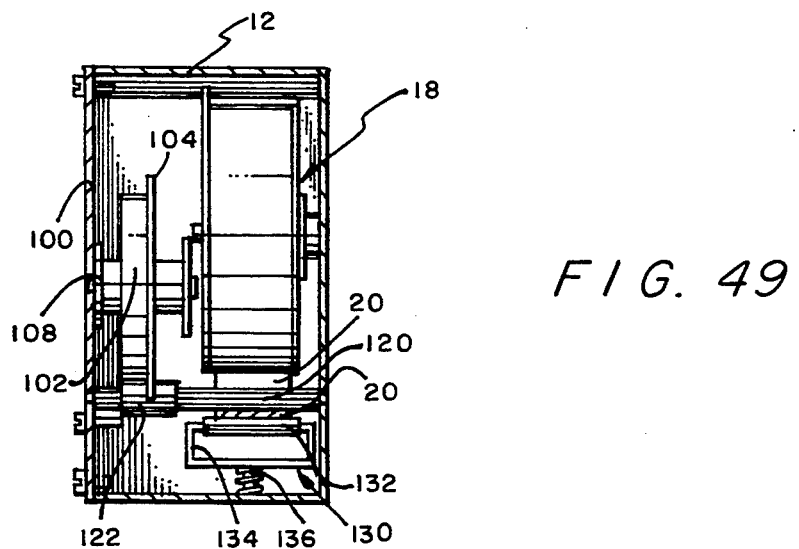
FIG. 49 is a vertical sectional view taken in direction of the arrows and along the plane of line 49—49 in FIG. 47.
Figure 56:
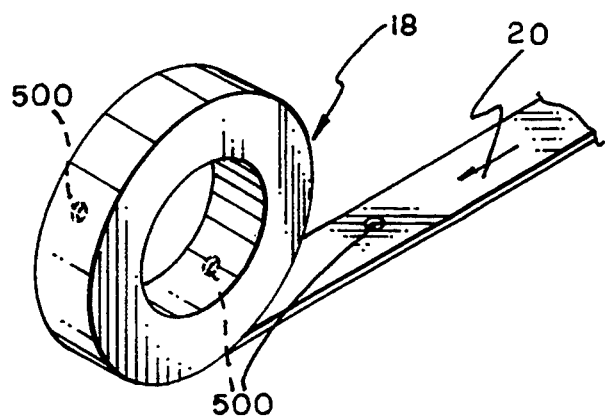
FIG. 56 is a perspective view of the coiled tape, disclosing the linkage engaging apertures disposed therein.
Figure 57:
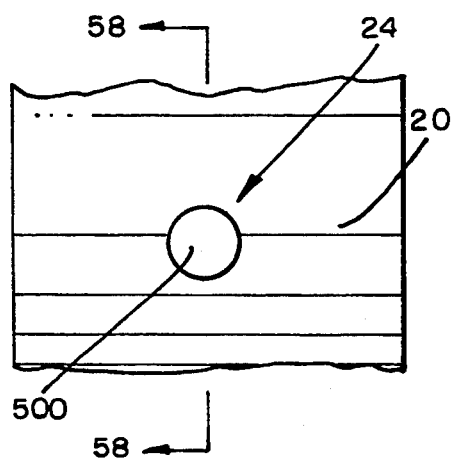
FIG. 57 is a partial view of the tape having the linkage engaging aperture disposed therein.

Referring now to FIGS. 32–39 for another embodiment of the present invention, the marker assembly 30 and the linkage assembly 54 are basically the same. The lever 58 extends through opening 69 such that the beveled end 58e is on the other side of the partitions 65 and 67. The engaging member 24 (i.e. lug 26) is no longer placed on the tape, but is conveniently placed on a sprocketed wheel member, generally illustrated as 100. Wheel member 100 has a circumference defining a generally smooth outer surface 102 to which the engaging member 24 (lug 26) connects. The circumference also includes a protruding sprocket 104. Wheel member 100 is rotatably mounted on a shaft 108. The other end of shaft 108 may be free or supported in aperture 110 of a bearing plate 112. Bearing plate 112 may be releasably secured to and between partition 65 and an end of the housing 12 or to one of the side inside walls with bolts 114 (see FIG. 35). Similarly, shaft 13 (which rotatably supports the coiled tape 18) may be free at the end opposed to the end being supported by an inside side wall of the housing 12 or supported in aperture 118. A shaft 120 is rotatably supported on and by the insides of the opposed side walls of the housing 12 as best shown in FIG. 34. The shaft 120 has a sprocket surface or member 122 keyed to or otherwise mounted to the shaft 120. The sprocket member 122 is rotatably engaged to the protruding sprocket 104 to move the same when shaft 120 turns. A biased roller means, generally illustrated as 130, is disposed in the bottom of housing 12 for biasing the tape 20 upwardly against roller 120 when the tape 20 passes therebetween. Biased roller means 130 includes a roller 132 rotatably supported by a frame 134 which is biased upwardly by a spring 136. The bottom of the frame 134 may have a tongue 600 (see FIG. 51) being vertically slidably supported within a sleeve 700 which is connected to the bottom of the housing 12, and spring 136 would bias the bottom of the frame 134 with its associated tongue 600 slidably moving up and down in the sleeve 700. The tape 20 slidably passes between shaft 120 and biased roller 132. As the tape 20 is being pulled and uncoiled from coiled tape 118 it frictionally passes against shaft 120 from the biasing force of the biased roller 132. Such frictional passages causes shaft 120 to rotate. Sprocket member 122 rotates with shaft 120. When sprocket member 122 rotates, wheel 100 rotates from the meshing of sprocket 104 with sprocket member 122. As wheel 100 rotates, the engaging member 24 (lug 26) comes in contact with the beveled end 58e of the lever 58 and the marking process commences. The gear or revolution ratio between the sprocket member 122/shaft 120 combination and the wheel 100 may be any ratio but is preferably one that when the tape 20 is pulled twelve (12) inches or sixteen (16) inches the wheel 100 makes a full revolution and activates the marker assembly 30 through the linkage assembly 54.

Referring now to FIGS. 40-51 for yet another embodiment of the present invention, there is provided a magnetic strip 224, a magnetic sensor 155, electrical power means (i.e. a battery 151), and an electronic solenoid 150, all of which replace the engaging member 24 and the linkage assembly 54. More specifically and referring to FIGS. 40-45, there is seen the magnetic strip 224 secured to the tape 20. Typically, there would be a plurality magnetic strips 224 spaced apart on the tape 20 at a distance that the marks 48 are to be spaced apart on the substrate 50. A pair of magnetic sensor holders 156—156 are secured to an inside wall of the housing 12. The holders 156—156 hold and support a magnetic sensor 155 in close proximity to the opening 69 such that as each magnetic strip 224 passes into the opening 69 (see FIG. 45), the magnetic sensor 155 is close enough to each magnetic strip 224 to sense the same to activate the electronic solenoid 150. A pair of battery holders 152—152 and a pair of solenoid holders 157—157 are also secured to an inside wall of the housing 12. The battery holders 152—152 are for holding and supporting the battery 151 (i.e. an electrical power means), and the solenoid holders 157—157 are for holding the electronic solenoid 150 which is capable, when activated by the battery 151/magnetic sensor 155, of operating and activating the marker assembly 30 by depressing and driving the shaft 36 downwardly. Magnetic sensor 155 is electronically engaged to the battery 151 by conductor 900, and to solenoid 150 by conductor 906. Solenoid 150 may be any of the well known state of the art solenoids that is capable of depressing and driving shaft 36 downwardly. Similarly, magnetic sensor 155 may be any of the well known state of the art magnetic sensors that is capable of sensing magnetically the magnetic strips 224 and activating the solenoid 150 by closing the circuit with the battery 151.

In operation of the marking device 10 depicted in FIGS. 40-46, the tab end 22 of the tape 20 would be fixed on one edge of the article or substrate 50 to be measured and serially marked (see FIG. 20) and the lower part of the marking device 10 (i.e. more specifically the housing 12) would be positioned flushed against the article such that the surface of the article to be marked supports the marking device 10 and communicates with the opening 16. After the marking device 10 is affixed and postured as such, the marking device 10 is manually pulled slidably across the surface to be marked, causing the tape 20 to start uncoiling from the coiled tape 18. When the first magnetic strip 224 passes over the shaft 70 and activates the magnetic sensor 155, the electrical circuit closes between the battery 151 and the solenoid 150 to cause the latter to drive spring biased shaft 36 downwardly until marker 44 contacts the article or substrate 50, causing the deposition of the mark 48. After the mark 48 has been placed on the article or substrate 50, the first magnetic strip 224 has passed out of opening 69 and away from the magnetic sensor 150, causing the latter to open the electrical circuit between the battery 151 and the solenoid 150 for the solenoid 150 to release the shaft 36 such that the spring 42 can drive the shaft 36 upwardly and release the marker 44 off of the substrate 50. The marking device 10 is continually pulled slidably across the surface to be marked (i.e. from left to right in FIG. 20) and the tape 20 continues to be uncoiled from coiled tape 18. When the second magnetic strip 224 passes over shaft 70 and activates the magnetic sensor 155, the operation is repeated again, causing the deposition of a second mark 48. The marking process can be repeated to deposit a third mark 48, a fourth mark 48, and so on, until the marking device 10 reaches the end of the article or substrate 50 as best shown in FIG. 20. As best shown in FIG. 21, the resulting article or substrate 50 has a surface bearing a plurality of marks 48 which are spaced apart by a distance generally equal to the distance that the magnetic strips 224 are spaced on the tape 20. Thus, if the magnetic strips 224 are spaced apart by one (1) foot on the tape 20, then the marks 48 are spaced one (1) foot apart. It is obvious that the distance between magnetic strips 224 on the tape 20 may vary and not be the same, depending on desired results by the user of the marking device 10. Typically, the deposed marks 48 on the surface of the article or substrate are approximately the same distance.

Referring now to FIGS. 47-51 for another embodiment of the present invention, the marker assembly, the solenoid 150 and the battery 151 are basically the same and located generally in the same location within the housing 12. The magnetic sensor 155 is disposed on the other side of partition 65 and 67. Holders 156—156 may be secured to bearing plate 112 (see FIG. 47) or to an inside wall of the housing 12 (see FIG. 43). The magnetic strip 224 is no longer on the tape, but is conveniently placed on the sprocketed wheel member 100. The operation of this embodiment of the invention is basically the same as that of FIG. 32-39 in combination with the embodiment of FIGS. 40-46. More specifically, as the tape 20 is being pulled and uncoiled from coiled tape 118 it frictionally passes against shaft 120 from the biasing force of the biased roller 132. Such frictional passages causes shaft 120 to rotate. Sprocket member 122 rotates with shaft 120. When sprocket member 122 rotates, wheel 100 rotates from the meshing of sprocket 104 with sprocket member 122. As wheel 100 rotates, the magnetic strip 224 comes or passes in proximity to the magnetic sensor 155 and the marking process commences. The gear or revolution ratio between the sprocket member 122/shaft 120 combination and the wheel 100 may be any ratio but is preferably one that when the tape 20 is pulled twelve (12) inches or sixteen (16) inches the wheel 100 makes a full revolution and activates the marker assembly 30 through the sensor 155/solenoid 150/battery 151 assembly.

Referring now to FIGS. 52-58 for yet another embodiment of the present invention, the marker assembly 30 is basically the same as the embodiment depicted in FIGS. 1–31. The linkage assembly 54 and tape 20 are similar to that depicted in FIGS. 1–31 with some notable exceptions. The linkage assembly 54 additionally comprises a third lever member 503 pivotally secured to an inner flange member 502 protruding from an inner wall of the housing 12. The shaft 62 is secured to the third lever 503, rather than the housing 12, as in the previous embodiments. The bearing 60 is secured thereto and lever 58 is secured to the bearing 60, such that lever 58 is pivotally coupled to the third lever 503. As previously mentioned, lever 58 is normally biased upwardly, or clockwise with respect to the view depicted by FIG. 54, by the spring member 64 which is disposed on the shaft 62. In this embodiment, as best shown in FIGS. 52 and 54, lever 58 comprises a pointed end 58f. The lever 58 extends through the opening 69 such that pointed end 58f is on the other side of the partitions 65 and 67. Additionally, the lever 503 is forwardly biased such that the lever 503 maintains a small amount of biasing force towards the upper partition member 65 (see FIG. 54). The spring 501, like spring 64, defines a structure comprising a helical coil 503c, and a pair of arms 503a and 503b extending therefrom. Therefore, forward bias is provided by the spring 501 acting on lever 503, and clockwise bias (with respect to the view depicted by FIG. 54) is provided by spring 64 acting on lever 58, thereby creating an action potential. In this embodiment, the linkage is actuated by at least one linkage engaging aperture 500 disposed in the tape 20, and preferably, as mentioned above, a plurality of such apertures 500 are disposed in the tape 20 at regular intervals (see FIGS. 56 and 57). The operation of the invention is basically the same as the embodiment depicted in FIGS. 1–31, except for, as mentioned before, the linkage assembly is actuated by the linkage engaging aperture 500. As best shown in FIGS. 52 and 54, the tape 20 is uncoiled from the coiled tape 18. When the first linkage engaging aperture 500 passes over shaft 70 and engages the pointed end 58f of the lever 58, lever 58 (with the assistance of the action potential created by the clockwise bias of spring 64) rotates clockwise which simultaneously causes the lever 74 to pivot counterclockwise (all rotational directions with respect to FIGS. 52 and 54). The pointed end 58f of the lever 58 is forced into the linkage engaging aperture 500 by the spring biased lever 503. As lever 74 rotates counterclockwise, end 74a of lever 74 commences to drive spring biased shaft 36 downwardly until marker 44 contacts the article or substrate 59, causing the deposition of the mark 48. After the mark 48 has been placed on the article or substrate 50, the linkage engaging aperture 500 slidably passes off of the pointed end 58f of lever 58 and the combination of the marker assembly 30/lever 74/lever 58—spring 64/lever 503—spring 501 immediately returns to the stead-state posture depicted in FIG. 54. The process repeats as tape 20 is uncoiled from coiled tape 18 and linkage engaging apertures 500 engage the linkage assembly, disposing marks 48 on the article or substrate 50. As previously mentioned, the resulting article or substrate 50 has a surface bearing a mark 48, or a plurality of marks 48—48 (see FIG. 55) which are spaced generally equal to the intervals of linkage engaging apertures 500.

Figure 61:
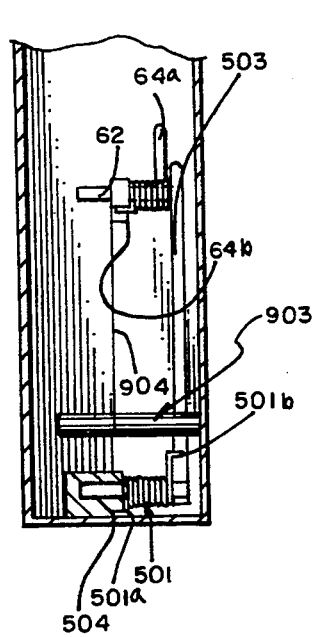
FIG. 61 is a partial vertical elevational view taken in direction of the arrows and along the plane of line 61—61 in FIG. 59.
Figure 60:
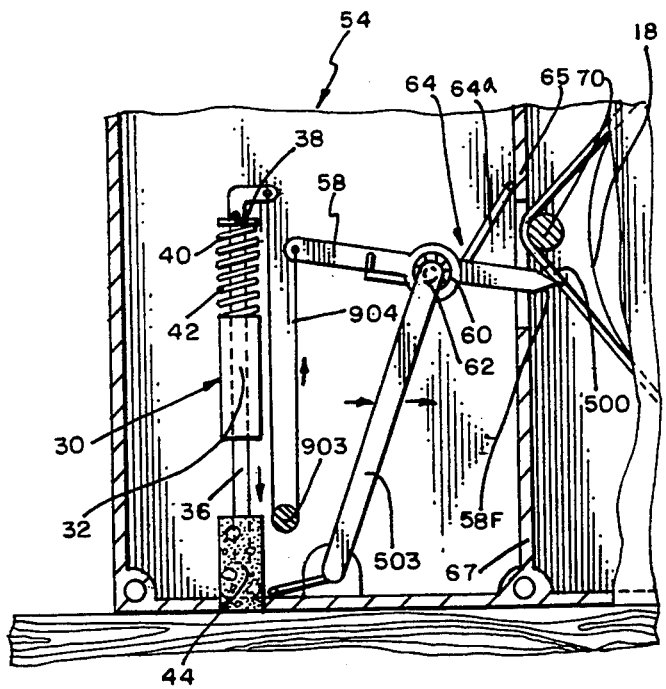
FIG. 60 is a partial vertical sectional view disclosing operation of the internals of the marking device after the linkage engaging aperture has engaged the pointed end of the lever to cause same to rotate and activate the marker assembly.

In another embodiment of the invention depicted in FIGS. 58–61, the end 58 of the lever has a string 904 that runs around a post 903 (which is secured to one of the walls, such as shown in FIG. 61) and is subsequently tied to the top of the shaft of the marker. As the lever 56 is pulled or rotates, the string 904 is simultaneously pulled causing the marker device to move up and down. Thus, lever 74 has been replaced by the combination of the string or line 904 and the post 903.

Figure 62:
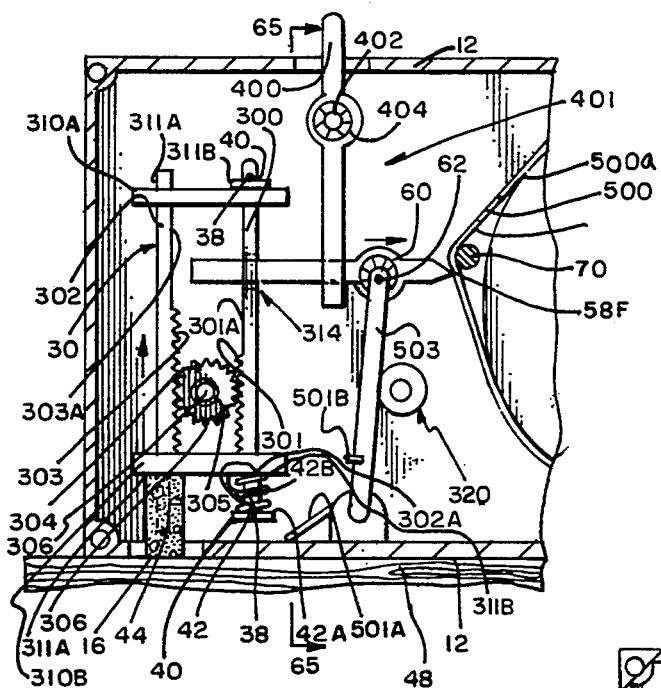
FIG. 62 is a partial vertical sectional view disclosing operation of internals of the marking device, before a linkage engaging aperture is to engage a pointed end of a lever.
Figure 63:
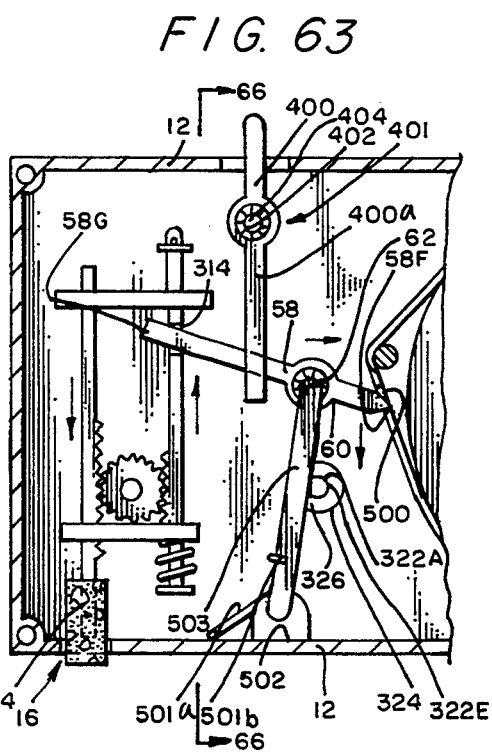
FIG. 63 is a partial vertical sectional view disclosing operation of internals of the marking device, after the pointed lever has engaged the linkage engaging aperture and caused the marking assembly to actuate.
Figure 64:
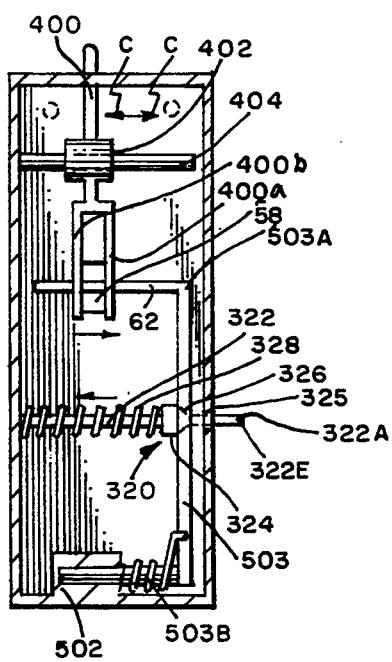
FIG. 64 is a partial vertical elevational view taken in direction of the arrows and along the plane of line 65—65 in FIG. 62.
Figure 65:
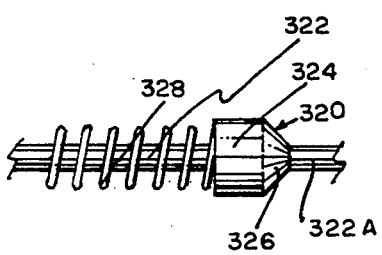
FIG. 65 is a partial elevational view of a collar, a shaft, and a spring of a disengaging member.

Referring now to FIGS. 62–66 for still another embodiment of the invention, there is seen the marking device 10 having a similar structure to the embodiment depicted in FIGS. 52–58. The embodiment of FIGS. 62–66 has modifications to both the linkage assembly and the marking assembly. Like the embodiment of FIGS. 52–58, lever 503 is coupled to flange 502 and to lever 58 and lever 58 is secured to bearing 60. Bearing 60 of lever 58 is slidably engaged to shaft 62. Shaft 62 is secured to lever 503, such that shaft 62 is generally perpendicular to lever 503. Another shaft 404 is secured to an inside wall of the housing 12 such that a positioning assembly, generally illustrated as 401, may slide thereon. The positioning assembly comprises a selector lever member 400 and the shaft member 404. The selector lever comprises an aperture 402 disposed therein for slidably engaging the shaft member 404. A pair of arms 400A–400B are secured to the selector lever such that the arms 400A–400B and the selector lever 400 define a structure that is generally U-shaped. Lever 58 is positioned between the arms 400A–400B of the selector lever 400 such that lever 58 may be slidably moved along shaft 62 of lever 503 by sliding the selector lever 400 in the direction of the arrows C—C in FIG. 64. The lever 58 is fashioned to move in this embodiment to allow the interval of marking with marker 44 to vary. To this end, at least one linkage engaging aperture 500A is placed on tape 20, as shown in FIG. 67 such that the linkage engaging aperture 500A is generally not in line with the linkage engaging aperture 500. Stated alternatively, given by way of example only, if linkage engaging aperture 500 is generally longitudinally centered in tape 20, as shown in FIG. 67, then linkage engaging aperture 500A is generally not centered, so that the interval of marks made by the linkage assembly does not include a mark made for linkage engaging aperture 500 and linkage engaging aperture 500A. Thus the interval for marks 48 placed on substrate 50 (as shown in FIG. 62) may be chosen by sliding selector lever 400 such that the pointed end 58f of lever 58 lines up with linkage engaging aperture 500A or another linkage engaging aperture, such as linkage engaging aperture 500. It is to be understood that the tape 20 may comprise as many sets of linkage engaging apertures 500–500A as necessary. The embodiment of the marking device 10 in FIGS. 62–66 has a modified marking assembly 30 comprising a first rod member 300 having a plurality of teeth 301 on an edge 301A and a second rod member 302 having a plurality of teeth 303 on an edge 303A. The first rod member 300 is situated in the housing such that a gear member 304 having an aperture 305 is disposed on a shaft member 306 situated therebetween. The plurality of teeth 301–303 of each rod member 300–302, respectively, mesh with gear member 304 such that as one rod member 300 moves upward, (i.e. when moved upward by lever 58 which is coupled thereto) the other rod member 302 moves downward. The marker 44 is secured to the rod member 32 such that the marker may pass through the opening 16 in the housing 12 and mark the substrate 50. A pair of opposed rod retainers 310A–310B are secured to the housing 12 such that the rod members 300–302 may slidably vertically move therein. The rod retainers 310A–310B each comprise a pair of apertures 311A and 311B wherethrough the rod members 300-302 may pass, respectively. Stated alternatively, the rod retainers 310A-310B are positioned such that the rod members 300-302 are supported thereby in a generally vertical position and in contact with the gear member 304. Rod member 300 is coupled to lever 58. The rod member 300 has an aperture 314 wherethrough end 58G of lever 58 slidably passes. The lever 58 of the linkage assembly is thus coupled to the rod 300 of the marking assembly. The rod member 300 further has spring member 42 secured thereto such that the marking assembly is spring biased. The spring member is engaged to the rod member 300 such that the coil of the spring generally resides perimetrically around an end 302A of rod member 300. A washer member or flange member 40 is secured to the end of the rod member and one end 42A of the spring 42 engages the washer 40. The other end 42B of the spring engages the rod retainer member 310B. In the steady-state, resting position, the marker 44 secured to the rod member 302 resides within the housing of the marking device 10. The rod member 300 is spring biased downward (with respect to the view given by FIGS. 62 & 63) and the relay action of the gear member relays the bias to rod member 302 to bias rod member 302 upwards. A disengaging member 320 is provided to arrest the clockwise bias of lever 503 to arrest the engagement of a linkage engaging aperture 500 by the lever 58 and thereby arrest the marking action of the marking device 10 as desired. The disengaging member comprises a spring biased shaft member 322 secured to an inside wall of the housing 12. A helical spring member 328 is disposed on the shaft member 322 such that the spring member 328 generally encompasses the shaft 328. A collar member 324 is slidably disposed on the shaft 322 such that the collar member 324 is spring biased toward the lever member 503 (see FIG. 64). The collar member 324 comprises a tapered end 326 terminating in a secondary collar member 322A. The secondary collar member 322A has a diameter that is smaller than the collar member 324, and protrudes through an opening 325 in the housing 12. When the disengaging member is in the "steady-state" resting position, the larger diameter collar member 324 resides against the lever 503 such that the clockwise bias of lever 503 is interrupted. The interruption of the clockwise bias of lever 503 causes the pointed end 58f of lever 58 (see FIG. 62) to miss the linkage engaging member(s) 500. The lever 503 is made to operate by pressing and holding the end 322E of secondary member 322A, such that the collar member 324 no longer impedes the clockwise bias of lever 503 (see FIG. 63). Continuing to refer to FIGS. 62-66 for operation of the embodiment of the marking device 10 depicted thereby lever 400 of the positioning assembly is slidably operated to select a lateral position relative to tape 20 for engaging a linkage engaging aperture corresponding thereto. As lever 400 is moved, lever 58 is moved accordingly. The end 322E of the disengaging member 322A is then pressed to allow lever 503 to spring clockwise and cause end 58f to be ready to engage the next linkage engaging aperture as tape 20 rolls downward past shaft 70. Linkage engaging aperture 500 rolls by and the spring bias of lever 503 causes pointed end 58f of lever 58 to enter the linkage aperture 500. As the tape is pulled further downward, the pointed end 58f of lever 58 is pulled downward and opposite end 58G is forced upward. The rod member 300 coupled to end 58G of lever 58 is likewise forced upward and the plurality of teeth 301 of rod member 300 engaged to gear member 304 causes the gear member to rotate counter-clockwise (with respect to the view shown by FIGS. 62 and 63). The teeth 303 of rod member 302 engaged to the gear member 304 accordingly force the rod member 302 downward, causing the marker 44 to extend through the housing 12 and deposit mark 48 on substrate 50. Tape 20 is further pulled downward past shaft 70 and as pointed end 58f of the lever 58 leaves the linkage engaging aperture, the spring member 42 biases the rod member 300 downward pushing the rod member 302 upward, simultaneously pushing end 58G of the lever 58 downward. Pointed end 58f of lever 58 is correspondingly pushed upward, and the resting "steady-state" of lever 58/lever 503/and rod 300 is re-established. Alternatively, the disengaging member 320 is not pressed and the linkage engaging members of tape 20 do not engage the pointed end 58f of lever 58 because lever 503 cannot rotate clockwise as it is blocked by collar member 324.

Figure 69:
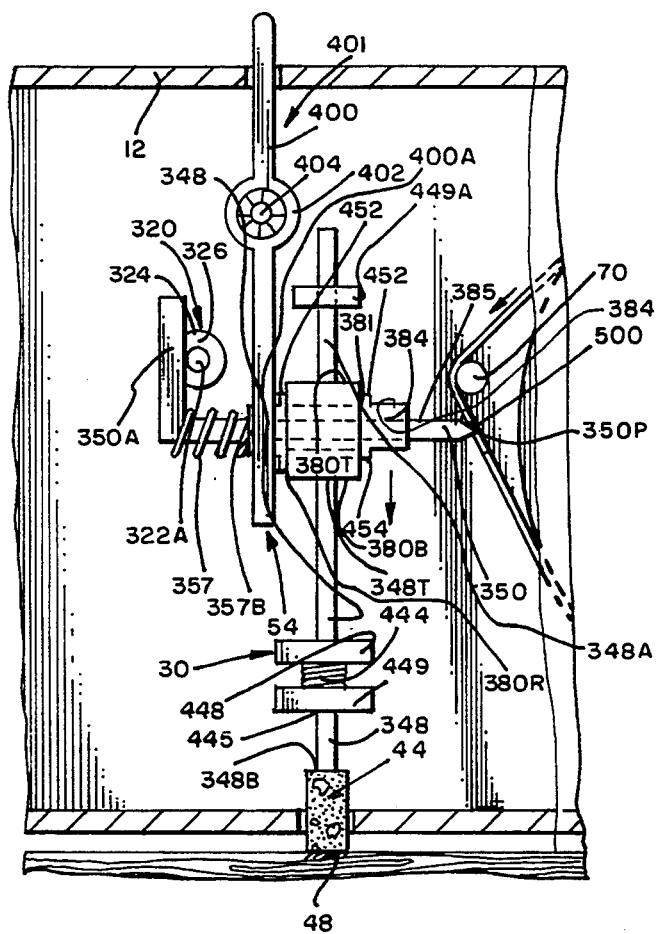
FIG. 69 is a partial vertical sectional view disclosing operation of internals of the marking device, after the pointed lever has engaged the linkage engaging aperture and caused the marking assembly to actuate.
Figure 70:
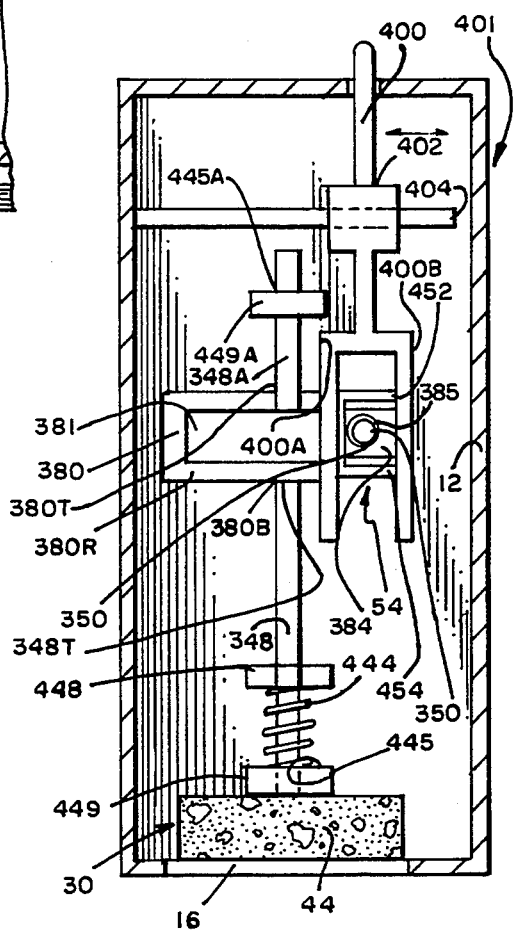
FIG. 70 is a partial vertical elevational view taken in direction of the arrows and along the plane of line 70—70 in FIG. 68.

Referring to FIGS. 68-70 for another embodiment of the invention, the marking device 10 is shown having a modified marker assembly and linkage assembly. The disengaging assembly 320 is disposed in the housing such that the collar member 324 and the secondary collar member 326 as discussed above act on a generally L-shaped shaft 350 instead of lever 503. The generally L-shaped shaft comprises an end 350A and a pointed end 350P. The end 350A may be engaged to the disengaging assembly 320 as shown in FIG. 68 to arrest the action of the marking device 10 or disengaged from the disengaging assembly (i.e. to allow lever 350 to be engaged to tape 20) to enable the marking action of the marking device. When in the disengaged mode, the end 350A abuts the secondary collar 322A, to prevent the shaft 350 from extending fully. The modified marker assembly 30 for this embodiment comprises the marker 44 secured to a bottom end 348B of a shaft 348. Shaft 348 is coupled to the housing 12 by a retaining lug member 449 which has an aperture 445 disposed therein wherethrough the shaft slidably passes. A lug member 448 is secured to the shaft 348 above the retaining lug 449 for retaining a spring member 444. The spring member 444 is a typical helical-type spring which is disposed around the shaft 348 such that the shaft 348 passes through a center of the spring 444. The spring member is disposed around the shaft 348 such that the spring is situated between the retaining lug member 449 and the lug member 448. The spring is compressed when shaft 348 is moved downward by the action of the linkage assembly (as shown in FIG. 69), and biases the lug member 448 upward to return the marking assembly to the steady-state position. The linkage assembly in this embodiment is secured to the shaft 348. A bottom 380B of a shaft guide housing member 380 is secured to a top end 348T of shaft 348. A top 380T of the shaft guide is secured to another shaft member 348A. The shaft member 348A is coupled to the housing 12 by another retaining lug member 449A. Like the retaining lug 449, the retaining lug 449A comprises an aperture 445A wherethrough the shaft 348A slidably passes. The shaft 348/shaft guide housing 380/shaft 348A combination is thus suspended in apertures 445-445A of retaining lugs 449-449A respectively. The spring member 444 provides upward spring bias to keep the marker 44 inside the housing and provide an action potential. The linkage assembly further comprises a shaft guide member 384 disposed in the shaft guide housing 380 for slidably guiding the L-shaped lever 350. The shaft guide 384 comprises a pair of retaining lugs 454—454 secured to a bottom of the shaft guide 384 such that the width of the shaft guide housing 380 (refer to FIG. 68) is generally the distance between the pair of retaining lugs 454—454. Stated alternatively, the retaining lugs 454—454 are spaced such that the shaft guide housing 380 is held therebetween. Likewise a pair of retaining lugs 452—452 is secured to a top of the shaft guide housing for retaining the shaft guide 384 in the shaft guide housing 380. The shaft guide 384 is disposed in the shaft guide housing 380, as shown in FIG. 70, such that the shaft guide may move side to side or laterally. The lateral movement of the shaft guide 384 within the shaft guide housing 380 is controlled by the positioning assembly. The arms 400A–400B, as shown in FIG. 70 are positioned such that shaft guide 384 is situated therebetween. Thus, as the selector lever 400 is slidably moved along shaft 404, the shaft guide 384 is correspondingly moved within the shaft guide housing 380 to select a lateral row of the linkage engaging apertures, such as linkage engaging aperture 500 or linkage engaging aperture 500A. The shaft 350 is slidably disposed in the shaft guide 384 such that it may be extended or retracted therefrom, as shown in FIGS. 68 and 69, for releasably engaging the linkage engaging apertures disposed in tape 20. As mentioned, the shaft 350 comprises pointed end 350P for engaging and releasing a linkage engaging aperture 500, and end 350A for engaging the collar member 324 of the disengaging assembly 320. A helical spring member 357 has one arm 357B secured to a rear end 380R of the shaft guide member and one arm 357A secured to the end 350A of the shaft member such that a coil 357C of the spring 357 surrounds the portion of shaft member 350 protruding from the rear 380R of the shaft guide housing 380. Spring member 357 provides bias to the shaft member 350 such that pointed end 350P is biased against the tape 20. Stated alternatively, with respect to the view in FIG. 68, the shaft 350 is biased to the right by spring 357, to predispose the pointed end 350P of the shaft 350 to engaging the linkage engaging aperture.

Continuing to refer to the FIGS. 68, 69, and 70 for the operation of the embodiment depicted therein, the modified linkage assembly 54 and the modified marking assembly 30 is provided with the disengaging assembly 320 and the positioning assembly 401. The disengaging assembly is disengaged from the end 350A of shaft 350 by pressing on end 322A thereof thereby causing the shaft 350 to be biased forward against tape 20 (by the action of spring 357). The selector lever 400 of the positioning assembly is slidably operated, as shown in FIG. 70, to select the position on tape 20 for engaging linkage engaging aperture 500, linkage engaging aperture 500A or any other suitable linkage engaging aperture which may be disposed on tape 20. The spring 444 holds the linkage assembly 54 and the marking assembly 30 in a "floating" steady state position with the marker 44 secured to the shaft 348. The spring 357 holds pointed end 350P of the shaft 350 against the tape 20. As tape 20 is pulled downward over shaft 70, linkage engaging aperture 500 disposed therein is pulled over pointed end 350P of shaft 350. The bias of spring 357 on shaft 350 pushes pointed end 350P into the linkage engaging aperture 500, until end 350A engages secondary collar 322A. As tape 20 is further pulled downward, shaft 350, being lodged in the linkage engaging aperture, (see FIG. 69), pulls shaft 348 downward, causing the marker 44 to extend through the opening 16 of the housing and leave a mark 48 on substrate 50. As shaft 348 is pulled downward, spring 444 provides increased resistance against lug 448 of shaft 348 to increasingly bias the shaft upward. As tape 20 is further pulled downward, linkage engaging aperture is pulled away from the pointed end 350P and pointed end 350P pops out of the linkage engaging aperture 500 causing the shaft 348 to move upward by the influence of spring 444.

Figure 71:
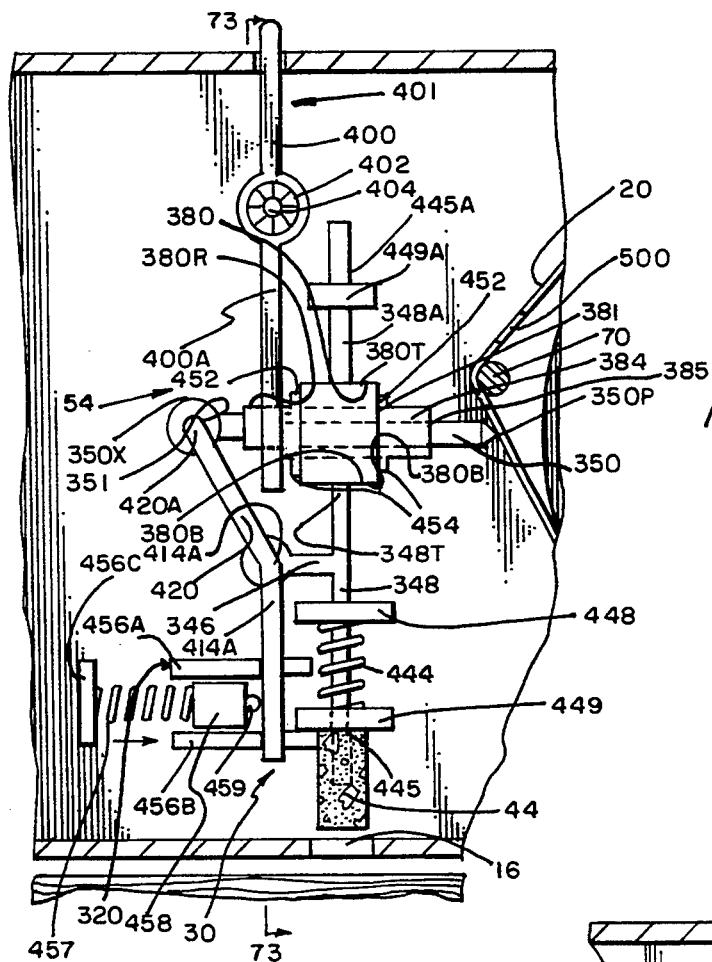
FIG. 71 is a partial vertical sectional view disclosing operation of internals of the marking, device, before a linkage engaging aperture is to engage a pointed end of a lever.
Figure 72:
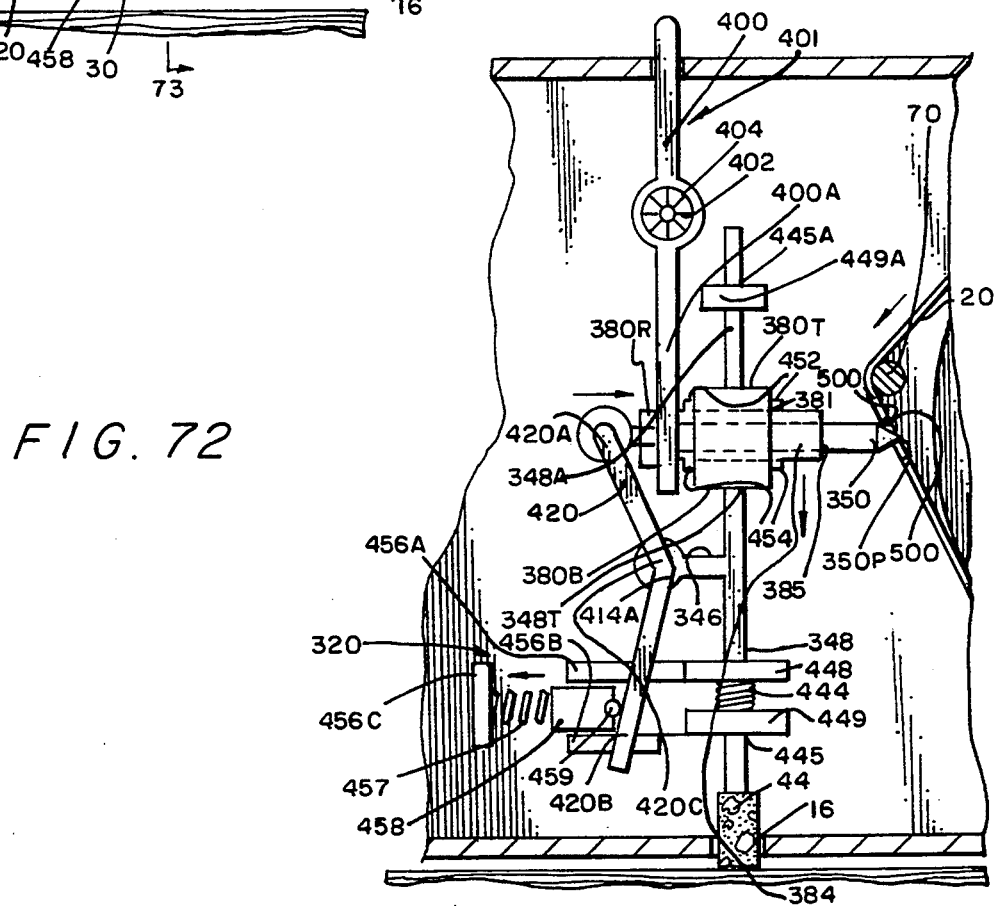
FIG. 72 is a partial vertical sectional view disclosing operation of internals of the marking device, after the pointed lever has engaged the linkage engaging aperture and caused the marking assembly to actuate.
Figure 73A:
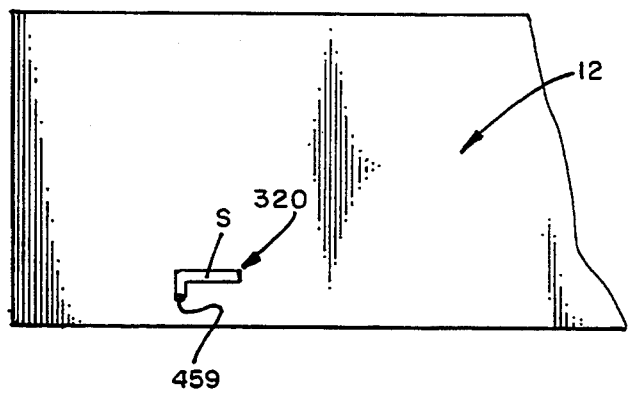
FIG. 73A is a schematic diagram of a locking slot for receiving a lip of a disengaging assembly.
Figure 73:
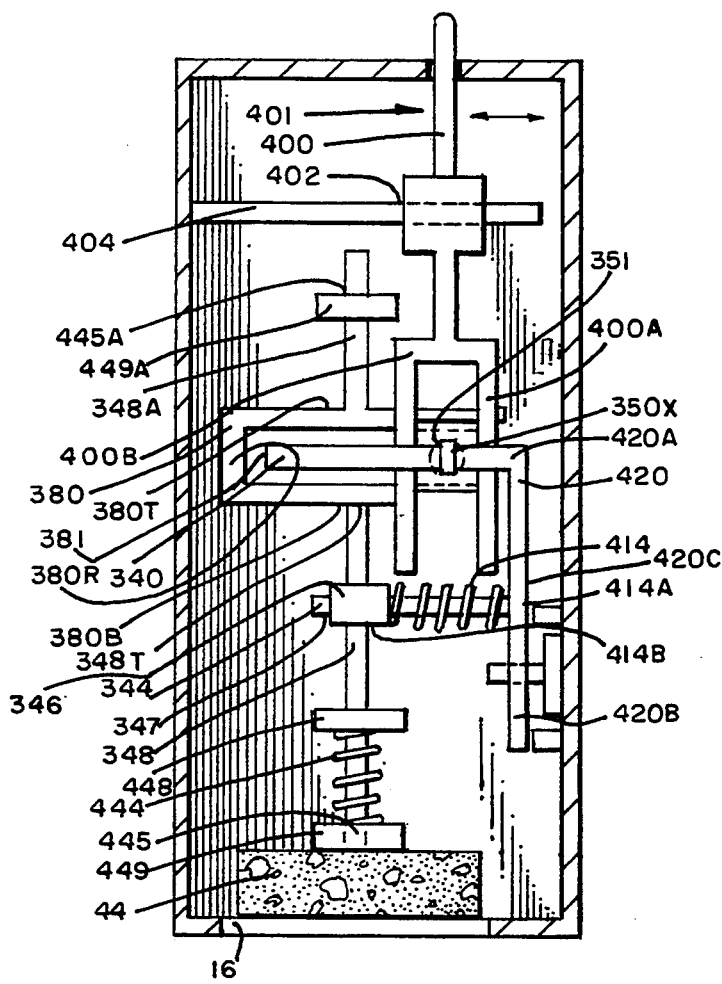
FIG. 73 is a partial vertical elevational view taken in direction of the arrows and along the plane of line 73—73 in FIG. 71.

Referring now to FIGS. 71–73 for still yet another embodiment of the invention, the marking device 10 has the marking assembly 30 and the linkage assembly 54 of the embodiment of FIGS. 68–70 with a few modifications. A lever member 420 comprising a first end 420A, a second end 420B and a bent section 420C is coupled to the shaft 350 and the shaft 348. Shaft 350 has the pointed end 350P, and an end 350X comprising an opening 351 wherethrough a shaft 340 is slidably disposed (see FIG. 73). The shaft 340 is secured to an end 420A of lever 420. As best shown in FIG. 71, shaft 348 has a lug member 346 secured thereto such that the lug member 346 is positioned generally above the lug member 448 and below the shaft guide housing member 380. The lug member 346 has an aperture 347 (see FIG. 73) disposed therein for slidably receiving a shaft member 344. Shaft member 344 is secured to a center section 420C of lever 420, and a helical spring member 414 is disposed around shaft 344 such that one arm 414A of spring 414 is engaged to the lever 420 and one arm 414B is engaged to lug 346. Lever 420 is disposed such that it may be rotated about shaft 344. With respect to the view in FIGS. 71 and 72, lever 420 is biased clockwise, such that the shaft member 350 is pushed forward by the action of shaft 340 (see FIG. 73) on shaft member 350, thereby creating an action potential. The embodiment of FIGS. 71–73 further has a pair of opposed retaining lugs 456A–456B secured to an inner wall of housing 12 such that a lug member 458 may be slidably disposed therebetween. A third retaining lug member 456C is secured to the left of the opposed retaining lugs 456A–456B (with respect to the view in FIGS. 71 and 72) and a spring 457 is disposed between the retaining lug 456C and the lug member 458. The lug member 458 has a lip member 459 secured to one end for engaging an end 420B of the lever 420. Spring 457 biases the lug member 458 forward such that the lip member 459 is in constant contact with end 420B of the lever 420. It may be appreciated that a modification of the disengaging assembly 320 is intended with lip 459, such as, given by way of example only, by forming a slot S into the housing 12 wherethrough lip member 459 may protrude and be locked into place. As previously mentioned, the lever 420 comprises a slight bend in the center section 420C. The bend of the lever 420C preferably comprises an obtuse angle of about 170 degrees, but it is to be understood that the angle of the lever may range from any angle suitable for lever 420, such as from about 90 degrees to about 220 degrees. The embodiment of FIGS. 71–73 depicts an angle of about 170 degrees. Further, as previously mentioned, the shaft 344 is secured to lever 420 at center section 420C, or at the point the lever begins the 170 degree bend.

Continuing to refer to FIGS. 71–73 for the operation of the invention, the marking assembly 30 and the linkage assembly are predisposed in a resting or steady-state position. Disengaging mechanism 320, as shown in FIG. 73, is disengaged such that the end 420B of lever 420 is not locked into position (i.e. such that lip 459 is not engaged to end 420B). As mentioned in the operation of the embodiment of FIGS. 67-70, the positioning assembly 401 is aligned such that the pointed end 350P of shaft 350 aligns with an appropriate linkage engaging aperture 500. Spring 414 biases the lever 420 clockwise (respective to the view in FIGS. 71 and 72) and causes the shaft 340 secured to the lever 420 to pushed towards tape 20. (see FIG. 71). As seen in FIG. 73, shaft 340 is slidably disposed in opening 351 of end 350X of shaft member 350. Shaft member is thus biased towards tape 20 by relaying the clockwise bias of lever 420 via shaft 340. Spring 457 of the disengaging assembly 320 creates an opposing action potential on end 420B of lever 420 by providing counter-clockwise bias thereon via the action of spring 457 on the lug member 458 and lip 459 to lock the linkage mechanism 54 and prevent the pointed end 350P from engaging the linkage engaging aperture 500 (as shown in FIG. 71). The disengaging assembly 320 is disengaged by pulling lip 459 away from end 420B of lever 420. As previously mentioned, the housing 12 may comprise a slotted opening S (as shown in FIG. 73A) wherethrough lip 459 protrudes such that it may be disengaged from end 420B of lever 420. After the disengaging assembly 320 is disengaged from lever 420, as tape 20 is pulled downward past shaft 70, pointed end 350P rests thereon. As linkage engaging aperture is pulled past the pointed end 350P as tape is further pulled downward past shaft 70, the pointed end 350P is pushed into the aperture by the action of spring 414 (see FIG. 73) on lever 420 (see FIG. 71). Thus the pointed end 350P enters the linkage engaging aperture 500 and becomes engaged thereto. As the tape is further pulled downward, having pointed end 350P lodged therein, the shaft 348 is pulled downward as in the embodiment of FIGS. 67-70. Lever 420 turns clockwise, as shown in FIG. 72. As shaft 348 is pulled downward, the marker 44 protrudes opening 16 to mark substrate 50. As the tape is still further pulled downward, pointed end 350P slips out of the linkage engaging aperture, and spring 444 of the marking assembly drives shaft 348 upward. Shaft 350/shaft 348 are then returned to steady-state or resting position for the next linkage engaging aperture.

Figure 74:
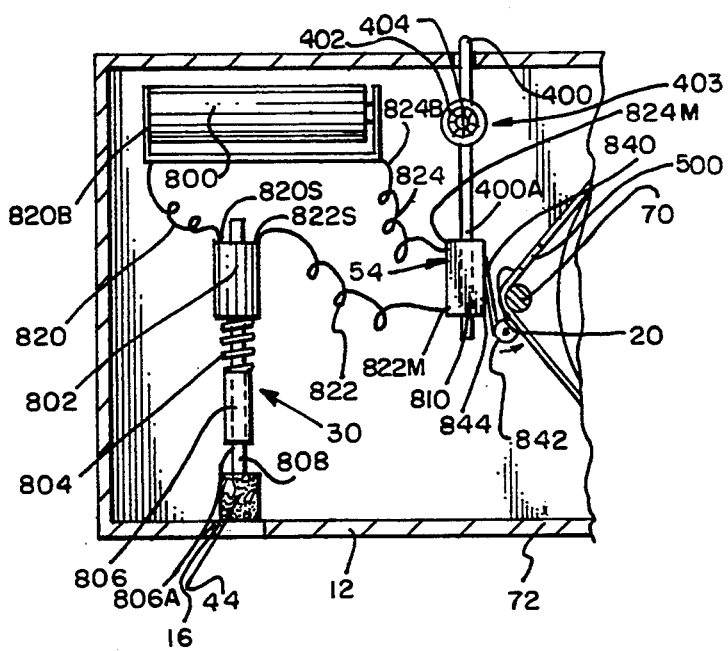
FIG. 74 is a partial vertical sectional view disclosing operation of internals of the marking, device, before a linkage engaging aperture is to engage a roller of an electrical switch.
Figure 75:
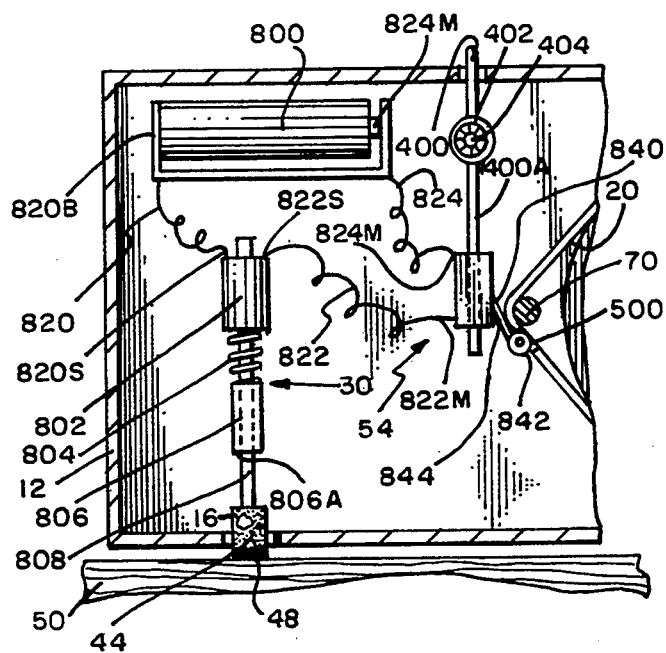
FIG. 75 is a partial vertical sectional view disclosing operation of internals of the marking device, after the roller has engaged the linkage engaging aperture and caused the marking assembly to actuate.
Figure 76:
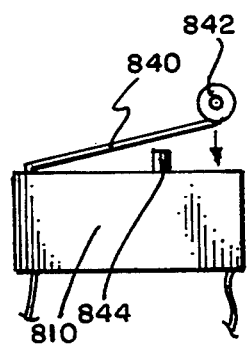
FIG. 76 is a side elevational view of the electrical switch.
Figure 77:
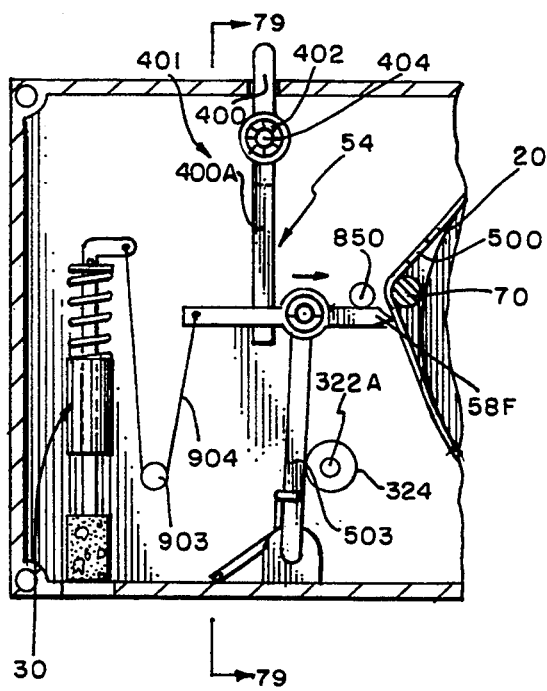
FIG. 77 is a partial vertical sectional view disclosing operation of internals of the marking, device, before a linkage engaging aperture is to engage a pointed end of a lever.
Figure 78:
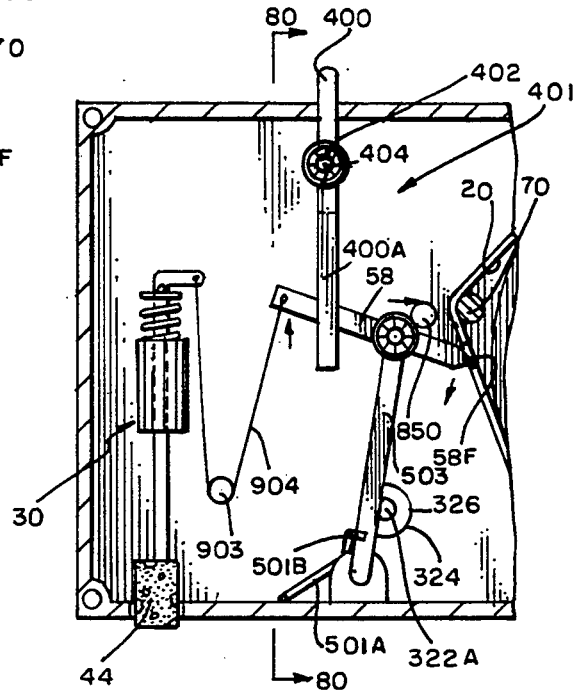
FIG. 78 is a partial vertical sectional view disclosing operation of internals of the marking device, after the pointed lever has engaged the linkage engaging aperture and caused the marking assembly to actuate.
Figure 79:
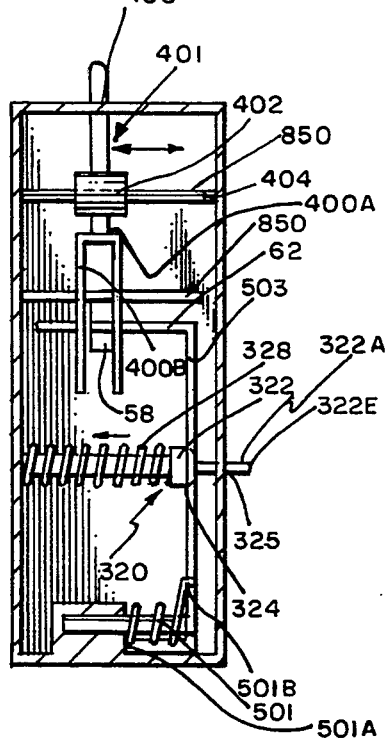
FIG. 79 is a partial vertical elevational view taken in direction of the arrows and along the plane of line 79—79 in FIG. 77.
Figure 80:
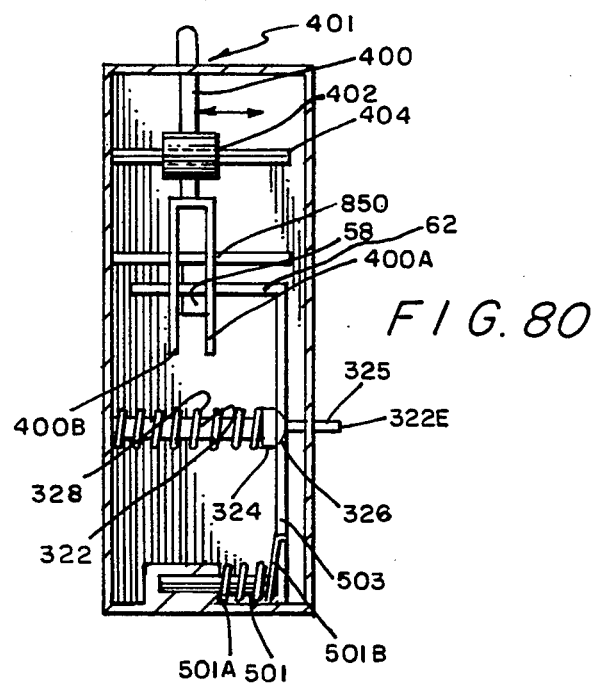
FIG. 80 is a partial vertical elevational view taken in direction of the arrows and along the plane of line 80—80 in FIG. 78.

Referring to FIGS. 74-76 for another embodiment of the invention, the marking device 10 is provided having the marking assembly 30 comprising a state of the art electrical solenoid member 802 secured to the housing 12. The electrical solenoid member has a shaft 804 extending therefrom secured to the marker 44. A retaining lug member 806 having an aperture 806A is secured to the housing such that the shaft 804 of solenoid 802 passes through the aperture 806A. A battery member 800 is secured to the housing 12 and an electrical line 820 couples one electrical side 820B of the battery to one electrical side 820S of the solenoid 802. The positioning assembly 54 of the embodiment of FIGS. 71-73 is provided. Selector lever 400 having aperture 402 is disposed on shaft 404. The linkage assembly of this embodiment comprises a state of the art electrical switch member 810. The electrical switch member 810 comprises a spring member 840 and a roller member 842 secured to one end of the spring member 840. An electrical contact 844 is opened when the spring member 840 is pressed toward the body of the switch 810 (see FIG. 76). Alternatively, the electrical contact established at sides 824M-822M of switch 810 is closed when the spring member 840 swings away from the body of the switch 810. Switch 810 is secured to arm 400A of the positioning assembly 320 such that the switch may be moved by the arms 400A thereof, as in the embodiments of FIGS. 67-73. An electrical side 822S of the solenoid is coupled to electrical side 822M of the switch via electrical line 822, and an electrical side 824B of the battery is coupled to an electrical side 824M of the switch via electrical line 824. The roller member 842 is positioned such that as a linkage engaging aperture 500 passes thereby, the roller member 842 enters the linkage engaging aperture 500 thereby closing the electrical contact at sides 822M-824M to cause the battery 800 to actuate the solenoid member 802 and drive the marker 44 secured to the solenoid shaft 808 through opening 16 and mark substrate 50. Spring member 804 causes the marker 44 to return to a resting position after the contact at sides 822M-824M of the switch is interrupted.

Figure 58:
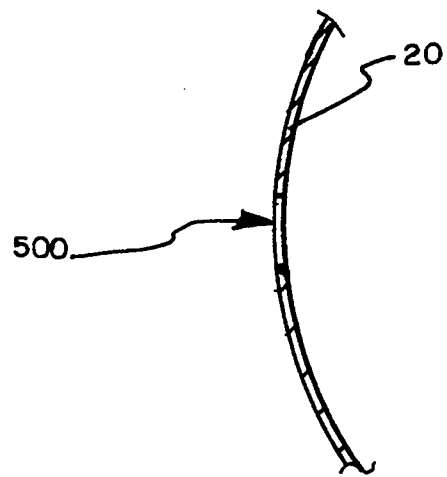
FIG. 58 is a vertical sectional view taken in direction of the arrows and along the plane of line 58—58 in FIG. 57.
Figure 59:
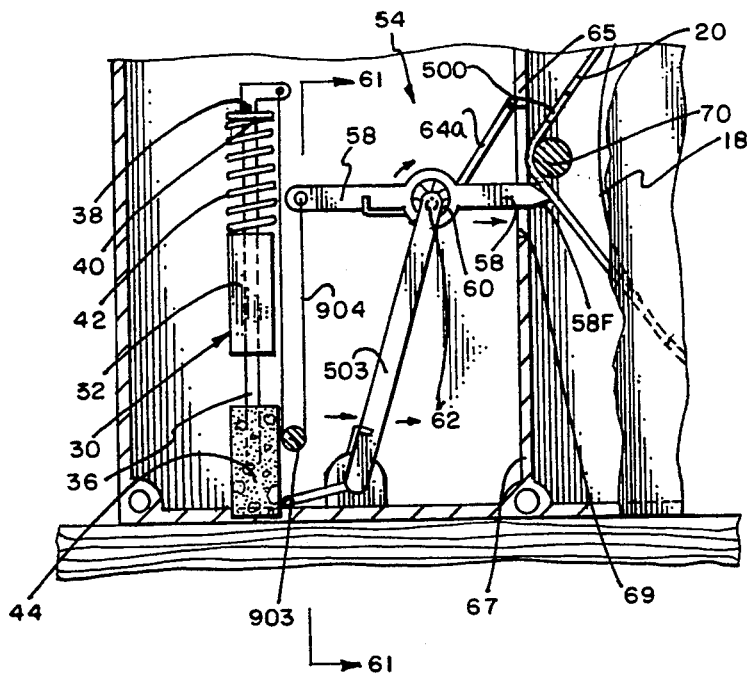
FIG. 59 is a partial vertical sectional view disclosing operation of the internals of the marking device, immediately before a linkage engaging aperture is to engage a pointed end of a lever.

Referring to FIGS. 77-80 for yet another embodiment of the present invention, the marking device 10 is shown having basically the same linkage assembly 54 as the embodiment of FIG. 52, and the same marking assembly as the embodiment of FIG. 58. The disengaging assembly 320 additionally is fitted thereto. The marking assembly comprises the string 904 that runs around post 903 (which is secured to one of the walls, such as shown in FIG. 61) and is subsequently tied to the top of the shaft of the marker 44. As lever 53 is rotated (by the action of the pointed end 58f in linkage engaging aperture 500), the string 904 is simultaneously pulled causing the marker device to move up and down. The lever 503 biases the lever 53 clockwise (with respect to the view given in FIGS. 77-78) such the lever 58 is pushed towards the tape 20. The disengaging assembly 320 acts upon the lever 503, interrupting the clockwise bias of lever 503 on lever 58 when collar 324 engages lever 503. When the end 322A is depressed, the lever 503 rotates clockwise to allow the lever 58 to push against the tape 20 and engage the linkage engaging aperture 500 as it passes by when tape 20 is pulled downward past shaft 70. A rest stop member 850 is secured to the housing such that when the lever 58 is in a resting position, the spring bias of the marking assembly 30 does not pull the lever 58 counterclockwise too much. The positioning assembly of the embodiments of FIGS. 67-76 has arms 400A-400B secured to the lever 58. Lever 58 is slidably disposed on shaft 62 of the lever 503, such that the selector lever 400 of the positioning assembly may slide the lever 58 with arms 400A-400B.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

We claim:

1. A marking device comprising a housing having a tape opening and a marking opening; a coiled tape disposed within the housing such that the coiled tape may be extended or retracted through the tape opening; at least one linkage engaging member secured to the coiled tape; a marking assembly movably disposed within the housing and adaptable to extend and retract through the marker opening; and a linkage assembly movably disposed within the housing such that when the linkage engaging member engages the linkage assembly, the linkage assembly engages and moves the marking assembly through the marker opening.

2. A marking device comprising a housing having a tape opening and a marker opening; a coiled tape disposed within the housing such that as tape is uncoiled from the coiled tape, the tape may be extended or retracted through the tape opening; a biased lower roller means disposed in said housing for biasing the tape against an upper roller means as it is being uncoiled; upper roller means rotatably disposed in said housing for engaging the tape as it is being uncoiled; a wheel member rotatably disposed within said housing and rotatably engaging the upper roller means; at least one linkage engaging member secured to the wheel member; a marking assembly movably disposed within the housing and adaptable to extend and retract through the marker opening; and a linkage assembly disposed within the housing such that when the linkage engaging member engages the linkage assembly, the linkage assembly engages and moves the marking assembly through the marker opening.

3. A marking device comprising a housing having a tape opening and a marking opening; a coiled tape disposed within the housing such that the coiled tape may be extended or retracted through the tape opening; at least one magnetic strip means secured to the coiled tape for activating a magnetic sensor; a marking assembly movably disposed within the housing and adaptable to extend and retract through the marker opening; a magnetic sensor such that when the magnetic strip means activates the magnetic sensor secured to the inside of said housing; and an electronic solenoid disposed within the housing and electrically engaged to said magnetic sensor such that when the magnetic strip means activates the magnetic sensor, the electronic solenoid engages and moves the marking assembly through the marker opening; and electrical power means electrically engaged to said electronic solenoid and said magnetic sensor.

4. The marking device of claim 1 wherein said linkage assembly comprises a first lever member pivotally secured to said housing and a second lever member pivotally secured to said housing such as to be capable of engaging the first lever member and the marking assembly.

5. The marking device of claim 4 wherein said first lever member is spring biased.

6. The marking device of claim 5 additionally comprising a first partition member secured to the housing and a second partition member secured to the housing and spaced from the first partition member to define a partition opening.

7. The marking device of claim 6 additionally comprising a tape shaft secured to said housing and having said coil tape slidably passing thereover such that said least one linkage engaging member removably passes into said partition opening to engage said first lever member.

8. The marking device of claim 4 wherein said marking device assembly comprises a bracket member secured to the housing and having a bracket opening; a marker shaft slidably passing through said bracket opening such as to be capable of sliding up and down; a marker secured to an end of the marker shaft; and a marker spring bias member engaged to said marker shaft to biasing the marker shaft such that when the shaft is depressed by the second lever member the marker shaft is returned to an original posture when depression by the second lever member is released.

9. The marking device of claim 2 wherein said linkage assembly comprises a first lever member pivotally secured to said housing and a second lever member pivotally secured to said housing such as to be capable of engaging the first lever member and the marking assembly.

10. The marking device of claim 9 wherein said first lever member is spring biased.

11. The marking device of claim 9 wherein said marking assembly comprises a bracket member secured to the housing and having a bracket opening; a marker shaft slidably passing through said bracket opening such as to be capable of sliding up and down; a marker secured to an end of the marker shaft; and a marker spring biasing member engaged to said marker shaft to bias the marker shaft such that when the shaft is depressed by the second lever member the marker shaft is returned to an original posture when depression by the second lever member is released.

12. The marking device of claim 9 additionally comprising a first partition member secured to the housing and a second partition member secured to the housing and spaced from the first partition member to define a partition opening; and wherein said first lever member passes through said partition opening such that the first lever member is capable of engaging the linkage engaging member secured to the wheel member.

13. The marking device of claim 12 wherein the first lever member engages the linkage engaging member on opposite side of said first partition and said second partition.

14. The marking device of claim 2 wherein said biased lower roller means comprises a frame supported by said housing; a roller rotatably supported by said frame, and a spring member supported by said housing and said frame for biasing the frame upwardly.

15. The marking device of claim 14 additionally comprising a sleeve secured to the housing and slidably engaging the frame.

16. The marking device of claim 3 additionally comprising a first partition member secured to the housing and a second partition member secured to the housing and spaced from the first partition member to define a partition opening.

17. The marking device of claim 16 wherein the magnetic sensor is disposed between a first magnetic sensor holder and a second magnetic sensor holder; said first magnetic sensor holder and said second magnetic sensor holder are secured to the housing next to the partition opening.

18. The marking device of claim 17 additionally comprising a tape shaft secured to said housing and having said coil tape slidably passing thereover such that when the magnetic strip means passes in proximity to said partition opening the magnetic sensor is activated thereby.

19. The marking device of claim 16 additionally comprising a first solenoid holder and a second solenoid holder secured to the housing.

20. The marking device of claim 16 wherein said marking device assembly comprises a bracket member secured to the housing and having a bracket opening; a marker shaft slidably passing through said bracket opening such as to be capable of sliding up and down; a marker secured to an end of the marker shaft; and a marker spring bias member engaged to said marker shaft to bias the marker shaft such that when the shaft is depressed by the solenoid the marker shaft is returned to an original posture when depression by said solenoid is released.

21. A marking device comprising a housing having a tape opening and a marking opening; a coiled tape disposed within the housing such that the coiled tape may be extended or retracted through the tape opening; a wheel member rotatably disposed within said housing and coupled to said coiled tape such as to rotate when said coiled tape is extended at least one magnetic strip means secured to the wheel member for activating a magnetic sensor; a marking assembly movably disposed within the housing and adaptable to extend and retract through the marker opening; a magnetic sensor secured to the inside of said housing; and an electronic solenoid disposed within the housing and electrically engaged to said magnetic sensor such that when the magnetic strip means activates the magnetic sensor, the electronic solenoid engages and moves the marking assembly through the marker opening; and electrical power means electrically engaged to said electronic solenoid and said magnetic sensor.

22. A marking device comprising a housing having a tape opening and a marking opening; a coiled tape disposed within the housing such that the coiled tape may be extended or retracted through the tape opening; at least one linkage engaging aperture disposed in the coiled tape; a marking assembly movably disposed within the housing and adaptable to extend and retract through the marker opening; and a linkage assembly movably disposed within the housing such that when the linkage engaging aperture engages the linkage assembly, the linkage assembly engages and moves the marking assembly through the marking opening.

23. The marking device of claim 22 wherein said linkage assembly comprises a first lever member pivotally coupled to a third lever member secured to said housing, and a second lever member pivotally secured to said housing such as to be capable of engaging the first lever member and the marking assembly.

24. The marking device of claim 23 wherein said first lever member is spring biased and wherein said third lever member is spring biased.

25. The marking device of claim 24 additionally comprising a first partition member secured to the housing and a second partition member secured to the housing and spaced from the first partition member to define a partition opening.

26. The marking device of claim 25 additionally comprising a tape shaft secured to said housing and having said coil tape slidably passing thereover such that said first lever member removably passes into said partition opening to engage said linkage engaging aperture passing thereover.

27. The marking device of claim 26 wherein said biased third lever member moves said first lever member into said partition opening.

28. The marking device of claim 23 wherein said marking device assembly comprises a bracket member secured to the housing and having a bracket opening; a marker shaft slidably passing through said bracket opening such as to be capable of sliding up and down; a marker secured to an end of the marker shaft; and a marker spring bias member engaged to said marker shaft to bias the marker shaft such that when the shaft is depressed by the second lever member the marker shaft is returned to an original posture when depression by the second lever member is released.

29. A marking device comprising a housing having a tape opening and a marking opening; a coiled tape disposed with the housing such that the coiled tape may be extended or retracted through the tape opening; at least one linkage engaging aperture means disposed in the coiled tape for activating an electrical switch; a marking assembly movably disposed within the housing and adaptable to extend and retract through the marker opening; an electrical switch such that the linkage engaging aperture means activates the electrical switch secured to the inside of said housing; an electronic solenoid disposed within the housing and electrically engaged to said electric switch such that when the linkage engaging aperture means activates the electrical switch, the electronic solenoid engages and moves the marking assembly through the marker opening; and electrical power means electrically engaged to said electronic solenoid and said electrical switch.

30. A marking device comprising
a housing having a tape opening and a marking opening;
a coiled tape disposed within the tape housing such that the coiled tape may be extended or retracted through the tape opening;
at least one linkage engaging aperture disposed in the coiled tape for engaging and moving a linkage assembly;
a positioning assembly movably supported by the housing;
a marking assembly movably disposed within the housing and adapted to extend and retract through the marking opening;
a linkage assembly coupled to the marking assembly and movably disposed within the housing for being engaged and moved by the linkage engaging aperture and engaged to said positioning assembly for being moved by said positioning assembly; and
said linkage assembly being adapted for responding to the linkage engaging aperture such that when said linkage engaging aperture engages and moves said linkage assembly, the linkage assembly engages and moves the marking assembly through the marker opening.

31. The marking device of claim 30 additionally comprising
a positioning opening;
said positioning assembly comprising a selector lever (400) having a selector aperture (402) and a pair of arm members (400A-400B) secured to said selector lever;
a positioning shaft member (404) secured to said housing for supporting said positioning assembly; and
said selector aperture slidably engaging said positioning shaft (404) such that said positioning assembly may slidably move along said positioning shaft.

32. The marking device of claim 31 additionally comprising
a first shaft member (348) slidably coupled to said housing for supporting a marker (44) such that said marker (44) may extend through said marker opening; and
a first spring member (444) for biasing the marking assembly such that a steady-state condition of said first spring member (444) on marking assembly retains said marker (44) within said housing.

33. The marking device of claim 32 additionally comprising
- a second shaft member (348A) slidably coupled to the housing;
- a shaft guide housing (380) secured to said second shaft (348A) such that said second shaft (348A) is secured along a top edge (380T) of said shaft guide housing;
- a shaft guide (384) movably disposed in said shaft guide housing (380) such that said shaft guide (384) may laterally move within said shaft guide housing (380);
- a third shaft member (350) having a first third shaft end (350P) and a second third shaft end (350X) slidably disposed within said shaft guide (384) for engaging said linkage engaging aperture;
- a lever member (420) pivotally coupled to said second third shaft end (350X); and
- a second spring member (414) engaged to said lever member for biasing said lever member (420) and said end (350X) of said third shaft member (359) to bias said third shaft member (350) against said tape (20).

34. The marking device of claim 33 additionally comprising
- a first retaining lug member (449) secured to said housing having a first retaining lug aperture (445) wherethrough said first shaft member (348) slidably passes for retaining said first shaft member (348) within said housing;
- a spring retaining lug member (448) secured to said first shaft member (348) for engaging said first spring member (444);
- said spring member (444) being disposed around said first shaft member (348) such that said first spring member (444) is interposed between said first retaining lug member (449) and said spring retaining lug member (448) for creating a marking spring bias action potential;
- said lever member (420) having a lever shaft member (344) secured to said lever member (420) for coupling said lever member (420) to said marking assembly; and
- said lever member (420) having a second spring member (414) engaged to said lever member (420) and to said first shaft member (348) of said marking assembly for creating a lever spring bias action potential.

35. The marking device of claim 34 additionally comprising
- a second retaining lug member (449A) secured to said housing having a second retaining lug aperture (445A) wherethrough said second shaft member (348A) slidably passes for retaining said second shaft member (348A) within said housing;
- a plurality of lip members (452) secured to said shaft guide (384) for coupling said shaft guide (384) to said shaft guide housing (380); and
- a lever aperture (347) disposed in said first shaft member (348) for slidably engaging said lever shaft member (344) such that said lever shaft member (344) may rotate therein.

36. The marking device of claim 35 additionally comprising a disengaging assembly; said disengaging assembly comprising
- a top disengaging lug member (456A) secured to said housing;
- a bottom disengaging lug member (456B) secured to said housing;
- a back disengaging lug member (456C) secured to said housing;
- a disengaging member (458) for coupling said lever member (420);
- said disengaging member (458) having a disengaging lip (459) secured thereto;
- a third spring member (457) interposed between said back disengaging lug member (456C) and to said disengaging member (458) and secured to said back disengaging lug member (456C) and to said disengaging member (458) for creating a disengaging spring bias action potential;
- said housing having a disengaging lip aperture (S) wherethrough said disengaging lip (457) protrudes; and
- said first shaft member (348) of said marking assembly comprising a top edge (348T) thereof secured along a bottom edge (380B) of said shaft guide housing (380).

37. The marking device of claim 36 wherein said arms (400A–400B) of said positioning assembly are coupled to said shaft guide (384) such that when said selector lever (400) is moved to cause the positioning assembly to move along positioning shaft member (404), the arms (400A–400B) of the positioning assembly move correspondingly and cause said shaft guide (384) to move correspondingly.

* * * * *